US012469628B2

(12) United States Patent
Iida et al.

(10) Patent No.: US 12,469,628 B2
(45) Date of Patent: Nov. 11, 2025

(54) INDUCTOR COMPONENT

(71) Applicant: Murata Manufacturing Co., Ltd., Kyoto-fu (JP)

(72) Inventors: Yuichi Iida, Nagaokakyo (JP); Fumihiko Naruse, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 878 days.

(21) Appl. No.: 17/460,069

(22) Filed: Aug. 27, 2021

(65) Prior Publication Data

US 2022/0084733 A1 Mar. 17, 2022

Related U.S. Application Data

(60) Provisional application No. 63/079,901, filed on Sep. 17, 2020.

(51) Int. Cl.
*H01F 27/28* (2006.01)
*H01F 17/00* (2006.01)
*H01F 27/29* (2006.01)

(52) U.S. Cl.
CPC ....... *H01F 17/0006* (2013.01); *H01F 27/292* (2013.01); *H01F 2017/0073* (2013.01)

(58) Field of Classification Search
CPC ............... H01F 17/0006; H01F 27/292; H01F 2017/0073; H01F 2017/004;
(Continued)

(56) References Cited

U.S. PATENT DOCUMENTS 3,988,764 A * 10/1976 Cline .................... H01L 29/045
257/E29.325
6,060,968 A 5/2000 Baltus et al.
(Continued)

FOREIGN PATENT DOCUMENTS

CN 104737246 A 6/2015
JP S59-103320 A 6/1984
(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor component comprising a single-layer glass plate of a rectangular parallelepiped shape with a width, a length longer than the width, and a height, and having a bottom surface defined by the length and width and a top surface positioned on a back side of the bottom surface; bottom-surface and top-surface conductors disposed above the bottom and top surfaces, respectively; through wirings each extending through a corresponding one of through holes formed in the glass plate; an underlying insulation layer above the bottom-surface conductors; and first and second terminal electrodes above the underlying insulation layer. The bottom-surface and top-surface conductors, and the through wirings are electrically connected as a circularly extending wiring that circularly extends around a winding axis parallel to the bottom surface and the length. The circularly extending wiring, and the first and second terminal electrodes, are electrically connected to each other as an inductor element.

18 Claims, 13 Drawing Sheets

(58) Field of Classification Search
CPC ...... H01F 17/0033; H01F 27/29; H01F 17/04; H01F 27/306; H01F 27/33; H01F 27/34; H01F 2017/048; H01F 2027/348
USPC .......................................... 336/200.232, 192
See application file for complete search history.

(56) References Cited

U.S. PATENT DOCUMENTS

| | | | | |
|---|---|---|---|---|
| 6,531,945 | B1 * | 3/2003 | Ahn | H01F 17/0033 336/200 |
| 11,342,896 | B2 | 5/2022 | Flemming et al. | |
| 2014/0104284 | A1 * | 4/2014 | Shenoy | H01F 41/041 336/200 |
| 2014/0354378 | A1 * | 12/2014 | Zuo | H03H 7/0115 29/25.03 |
| 2015/0334823 | A1 | 11/2015 | Hu | |
| 2017/0317401 | A1 * | 11/2017 | Tenno | H01Q 1/22 |
| 2018/0323005 | A1 * | 11/2018 | Sato | H01F 17/0013 |
| 2019/0093233 | A1 * | 3/2019 | Flemming | C23C 18/1882 |
| 2021/0350980 | A1 * | 11/2021 | Park | H01F 27/292 |

FOREIGN PATENT DOCUMENTS

| | | | |
|---|---|---|---|
| JP | H03-240210 | A | 10/1991 |
| JP | H06-325977 | A | 11/1994 |
| JP | H11-297533 | A | 10/1999 |
| JP | 2002-111220 | A | 4/2002 |
| JP | 2002-252101 | A | 9/2002 |
| JP | 2002-314218 | A | 10/2002 |
| JP | 2004-200227 | A | 7/2004 |
| JP | 2005-19747 | A | 1/2005 |
| JP | 2008-100866 | A | 5/2008 |
| JP | 2009-260106 | A | 11/2009 |
| JP | 2013-098350 | A | 5/2013 |
| JP | 2013-183007 | A | 9/2013 |
| JP | 2015-046494 | A | 3/2015 |
| JP | 2018-046257 | A | 3/2018 |
| JP | 2018078133 | A * | 5/2018 |
| WO | 2013/145043 | A1 | 10/2013 |
| WO | 2016/163437 | A1 | 10/2016 |

* cited by examiner

INDUCTOR COMPONENT

CROSS-REFERENCE TO RELATED APPLICATION

This application claims benefit of priority to U.S. Provisional Patent Application No. 63/079,901, filed Sep. 17, 2020, the entire content of which is incorporated herein by reference.

BACKGROUND

Technical Field

The present disclosure relates to an inductor component.

Background Art

JP-A-2013-98350 that is a Japanese patent application laid-open publication discloses a method of manufacturing a multi-layered inductor component having a multi-layer glass body that incorporates conductors inside. Specifically, prepared are a plurality of glass green sheets made from glass paste containing glass powder and thereafter printed and applied with conductor paste containing conductor powder such as Ag or Cu. The plurality of glass green sheets printed and applied with conductor paste are then layered and cut into individual pieces. At this time, ends of the conductor paste are exposed from each individual piece.

Next, these individual pieces are each fired to form a multi-layer glass body of the sintered glass paste and form inner conductors of the sintered conductor paste. At this time, the inner conductors are integrated with the multi-layer glass body and are incorporated inside the multi-layer glass body, with only the ends being exposed.

The ends of the inner conductors exposed from the multi-layer glass body are then plated to form terminal electrodes for electrical connection to the exterior. The multi-layered inductor component is thus completed that includes an inductor element composed of the inner conductors and the terminal electrodes.

SUMMARY

Different from the multi-layered inductor component above, a novel inductor component has been proposed in U.S. patent application Ser. No. 16/838,918 based on U.S. Provisional Patent Application No. 62/830,158.

This inductor component comprises a single-layer glass plate; outer-surface conductors as at least a part of an electric element, disposed above an outer surface of the single-layer glass plate; and terminal electrodes as terminals of the electric element, disposed above the outer surface of the single-layer glass plate and electrically connected to the outer-surface conductors.

This inductor component further comprises through wirings, as at least a part of the electric element, extending through through holes formed in the single-layer glass plate and electrically connected to the outer-surface conductors.

In this inductor component, the outer surface includes a bottom surface as one of principal surfaces of the single-layer glass plate, and a top surface positioned on a back side of the bottom surface; and the terminal electrodes include a first terminal electrode and a second terminal electrode that are input/output terminals of the electric element. The first terminal electrode and the second terminal electrode are shaped to have, above the bottom surface, principal surfaces parallel to the bottom surface. The outer-surface conductors include bottom-surface conductors and top-surface conductors that are disposed above the bottom surface and above the top surface, respectively, and that are connected to each other via the through wirings. Also, a circularly extending wiring composed of the bottom-surface conductors, the top-surface conductors, and the through wirings circularly extends around a winding axis parallel to the bottom surface.

For standardization, the inductor component often has an outer shape allowing, on a mounting board, a rectangular, for example, quadrangular arrangement with the length doubling the width. That is, in the inductor component above, the single-layer glass plate may be of a rectangular parallelepiped shape having a length, a width, and a height, the length being longer than the width, with one principal surface defined by the length and the width acting as the bottom surface. In this case, the following problems occur.

FIG. 3 is a schematic perspective view showing an inductor component 1 of Comparative Example. Disposed in the same layer of the inductor component 1 are a first terminal electrode 121 and a second terminal electrode 122 and bottom-surface conductors 11*b* of a circularly extending wiring 110, which are disposed above a bottom surface 100*b*. In this case, the manufacturing is easy since the first terminal electrode 121, the second terminal electrode 122, and the bottom-surface conductors 11*b* can be formed at the same time. On the contrary, in the inductor component 1, the formation range of the bottom-surface conductors 11*b* is limited by the first terminal electrode 121 and the second terminal electrode 122, limiting the number of circulations of the circularly extending wiring 110.

FIG. 4 is a schematic perspective view showing an inductor component 1*a* of Comparative Example. In the inductor component la, the bottom-surface conductors 11*b* extend on the bottom surface 100*b* in the length direction (X direction) of a single-layer glass plate 10, with an underlying insulation layer 15 being disposed on the bottom-surface conductors 11*b*, terminal electrodes 12 being disposed on the underlying insulation layer 15. In this case, since the outer-surface conductors 11 and the terminal electrodes 12 are formed in different layers, the outer-surface conductors 11 and the terminal electrodes 12 can be designed with greater freedom in layout. Furthermore, since the inner diameter of the circularly extending wiring is increased by forming the outer-surface conductors 11 along the length direction of the single-layer glass plate 10, the acquisition efficiency of an L value and a Q value of the inductor element on the outer shape of the inductor component 1*a* are improved. On the other hand, since in the inductor component 1*a* the winding axis of the circularly extending wiring becomes parallel to the width direction of the single-layer glass plate 10, the winding axis becomes relatively short, limiting the number of circulations of the circularly extending wiring. Moreover, the inductor component 1*a* undergoes a large change in the inductance value (L value) per number of circulations of the circularly extending wiring, rendering fine adjustment of the L value difficult.

An inductor component according to an aspect of the present disclosure has a structure in which the number of circulations of a circularly extending wiring is less limited while reducing the influence of firing. Furthermore, the inductor component according to an aspect of the present disclosure relatively reduces the change in L value per the number of circulations of the circularly extending wiring, facilitating fine adjustment of L value.

An inductor component according to an aspect of the present disclosure comprises a single-layer glass plate of a rectangular parallelepiped shape with a length, a width, and a height, the length being longer than the width, the single-layer glass plate having a bottom surface defined by the length and the width and a top surface positioned on a back side of the bottom surface; bottom-surface conductors and top-surface conductors disposed above the bottom surface and above the top surface, respectively; through wirings each extending through a corresponding one of through holes formed in the single-layer glass plate; an underlying insulation layer disposed above the bottom-surface conductors; and a first terminal electrode and a second terminal electrode disposed above the underlying insulation layer. The bottom-surface conductors, the top-surface conductors, and the through wirings are electrically connected to each other to constitute a circularly extending wiring that circularly extends around a winding axis parallel to the bottom surface and the length. The circularly extending wiring, the first terminal electrode, and the second terminal electrode are electrically connected to each other to constitute an inductor element.

In this specification, "single-layer glass plate" is a concept against the multi-layer glass body and, more specifically, refers to a glass plate not incorporating the conductors integrated inside the glass, that is, the inner conductors.

"Outer surface of the single-layer glass plate " including the bottom surface and the top surface of the single-layer glass plate does not simply mean a surface of the single-layer glass plate facing its outer peripheral side, but means a surface as a boundary between the outer side and the inner side of the single-layer glass plate. "Above the outer surface (bottom surface and top surface)" does not refer to an absolute unidirectional direction, such as vertically above, which is defined by the direction of gravity, but refers to a direction, with respect to the outer surface, going toward the outer side, of the outer side and the inner side when the outer surface is the boundary therebetween. Therefore, "above the outer surface" is a relative direction defined by the orientation of the outer surface. From the above, "disposed above the outer surface of the single-layer glass plate" means being positioned on the outer side of the glass body and not being incorporated inside the glass body of the single-layer glass plate.

"Outer surface of the single-layer glass plate" above includes also the surfaces of the through wirings and of the grooved portions since they are surfaces becoming the boundary between the outer side and the inner side of the glass body. The boundary above between the outer side and the inner side of the glass body can easily be grasped by cross-section analysis of the single-layer glass plate using, for example, a scanning electron microscope (SEM).

"Above" with respect to an element includes not only "above" spaced apart from the element, that is, an upper position via another object on the element or a spaced-apart upper position, but also a directly-above position in contact with (i.e. on) the element.

In the inductor component of the aspect above, the bottom-surface conductors, the top-surface conductors, and the through wirings are not incorporated inside the single-layer glass plate, reducing the influence caused by the firing. In the inductor component of the aspect above, the first terminal electrode and the second terminal electrode are disposed above the underlying insulation layer disposed above the bottom-surface conductors, reducing the limitation in the number of circulations of the circularly extending wiring. In the inductor component of the aspect above, the circularly extending wiring circularly extends around the winding axis parallel to the length of the single-layer glass plate, thus reducing the limitation in the number of circulations of the circularly extending wiring and relatively reducing the change in the L value per the number of circulations of the circularly extending wiring, to consequently facilitate the fine adjustment of the L value.

DETAILED DESCRIPTION

An embodiment as one mode of the present disclosure will now be described with reference to the drawings. Note that the drawings are schematic ones and that the dimensions, positional relationships, and shapes of the whole and parts may be modified or omitted.

Embodiment

Figure 1:
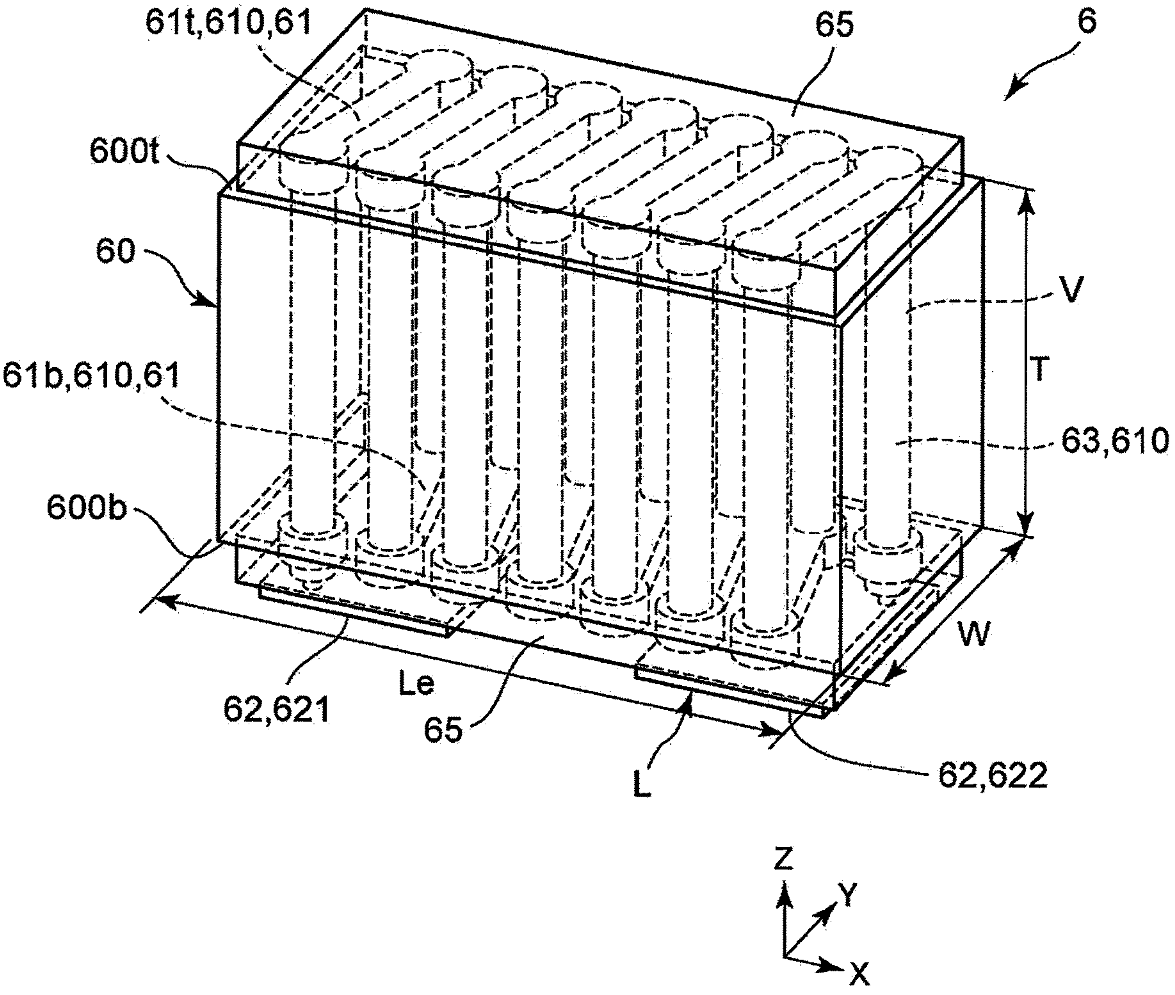
FIG. 1 is a schematic perspective view of an inductor component as viewed from its top surface side.
Figure 2:
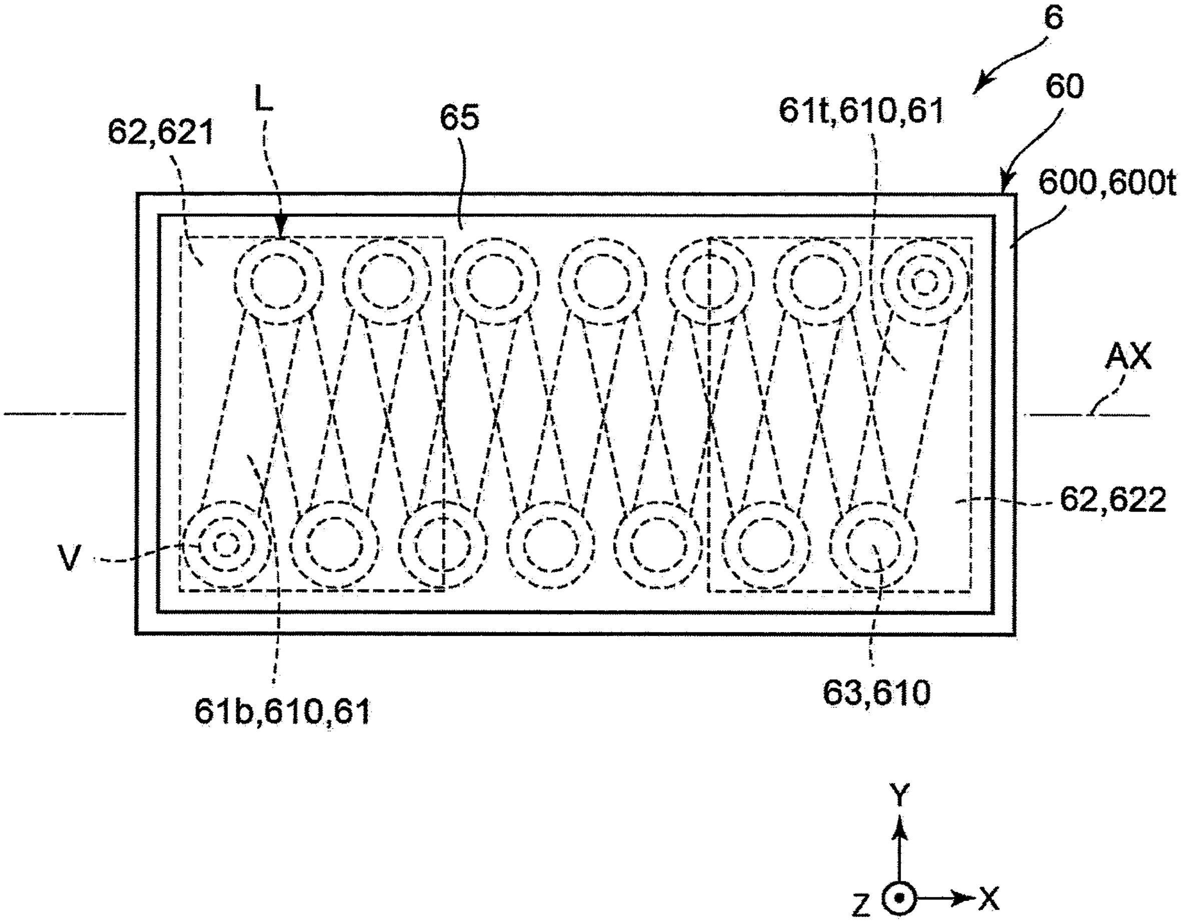
FIG. 2 is a schematic top view of the inductor component as viewed from its top surface side.

An inductor component 6 according to the embodiment will be described below. FIG. 1 is a schematic perspective view of the inductor component 6 as viewed from its top surface side. FIG. 2 is a schematic top view of the inductor component 6 as viewed from its top surface side.

1. Overview Structure

An overview structure of the inductor component 6 will be described. The inductor component 6 is a surface-mount-type electronic component including an inductor element L used as an electric element in e.g. a high-frequency signal transmission circuit. The inductor component 6 comprises: a single-layer glass plate 60 of a rectangular parallelepiped shape with a length Le, a width W, and a height T, the length Le being longer than the width W, the single-layer glass plate 60 having a bottom surface 600*b* defined by the length Le and the width W and a top surface 600*t* positioned on the back side of the bottom surface 600*b;* bottom-surface conductors 61*b* and top-surface conductors 61*t* that are disposed above the bottom surface 600*b* and above the top surface 600*t,* respectively; through wirings 63 extending through through holes V formed in the single-layer glass plate 60; an underlying insulation layer 65 disposed above the bottom-surface conductors 61*b;* and a first terminal electrode 621 and a second terminal electrode 622 as terminal electrodes 62 disposed above the underlying insulation layer 65.

In the inductor component 6, a circularly extending wiring 610 formed from the bottom-surface conductors 61*b,* the top-surface conductors 61*t,* and the through wirings 63 that are electrically connected together circularly extends around a winding axis AX parallel to the bottom surface 600*b* and the length Le so that the circularly extending wiring 610, the first terminal electrode 621 and the second terminal electrode 622 are electrically connected together to constitute the inductor element L.

Due to the structure above, in the inductor component 6, since the bottom-surface conductors 61*b* and the top-surface conductors 61*t* as the outer-surface conductors 61 and the terminal electrodes 62 are disposed above the bottom surface 600*b* and the top surface 600*t* as the outer surfaces 600 of the single-layer glass plate 60, the outer-surface conductors 61 and the terminal electrodes 62 are not incorporated into the single-layer glass plate 60. Similarly, in the inductor component 6, the through wirings 63 extend through the through holes V as the outer surfaces 600 of the single-layer glass plate 60 so that the through wirings 63 are also not incorporated into the single-layer glass plate 60. Accordingly, the inductor component 6 can reduce the influence of firing.

Further, in the inductor component 6, since the first terminal electrode 621 and the second terminal electrode 622 are disposed above the underlying insulation layer 65 disposed above the bottom-surface conductors 61*b,* it is possible to set the formation range of the bottom-surface conductors 61*b,* independently of the first terminal electrode 621 and the second terminal electrode 622, resulting in improved design freedom of the circularly extending wiring 610 and in less limitation to the number of circulations of the circularly extending wiring 610.

Further, in the inductor component 6, since the circularly extending wiring 610 circularly extends around the winding axis AX parallel to the length Le of the single-layer glass plate 60, the winding axis AX becomes relatively long, resulting in improved design freedom of the circularly extending wiring 610 and in less limitation to the number of circulations of the circularly extending wiring 610. Furthermore, in this case, since the inner diameter of the circularly extending wiring 610 is oriented to a direction parallel to the width W of the single-layer glass plate 60, the inner diameter can become relatively small, resulting in a relatively small change of the L value per number of circulations of the circularly extending wiring 610. For this reason, the inductor component 6 allows easy fine adjustment of the L value. In particular, this is advantageous for the inductor component 6 when narrowing the characteristic deviation is required in circuit designing.

Further, in the inductor component 6, the first terminal electrode 621 and the second terminal electrode 622 are shaped to have, above the bottom surface 600*b*, principal surfaces parallel to the bottom surface 600*b*. Due to the structure above, since the inductor component 6 comprises, on the bottom surface 600*b* side, the input/output terminals of the inductor element L having a surface allowing adhesion of the solder in the direction parallel to the bottom surface 600*b*, it becomes a surface-mount-type electronic component enabling surface mounting on the bottom surface 600*b* as a mounting surface, with a reduced mounting area.

Note that the first terminal electrode 621 and the second terminal electrode 622 are shaped to have principal surfaces parallel to the bottom surface 600*b* but that they may include other portions than the above. For example, the first terminal electrode 621 and the second terminal electrode 622 may also be of an L shape having a principal surface also above an end surface vertical to the bottom surface 600*b* of the single-layer glass plate 60 and, furthermore, they may also be of a slant electrode shape having triangular principal surfaces also above side surfaces vertical to the bottom surface 600*b* and the end surface of the single-layer glass plate 60. Then, the first terminal electrode 621 and the second terminal electrode 622 may also have a principal surface also above the top surface 600*t* of the single-layer glass plate 60, or they may also be of a five-surface electrode shape having principal surfaces above the bottom surface 600*b*, the top surface 600*t*, the terminal end, and two side surfaces.

Further, in the inductor component 6, the first terminal electrode 621 and the second terminal electrode 622 lie at positions overlapping with the bottom-surface conductors 61*b* as viewed from a direction parallel to the height T. This allows the bottom-surface conductors 61*b* to be formed in a wider range, enabling improvement in design freedom of the circularly extending wiring 610 and increase in the L value.

Further, in the inductor component 6, the circularly extending wiring 610 circulates twice at each of a position overlapping with the first terminal electrode 621 and a position overlapping with the second terminal electrode 622, as viewed from the direction parallel to the height T. This can further increase the L value. Note in the inductor component 6 that at the position overlapping with the first terminal electrode 621 or at the position overlapping with the second terminal electrode 622 as viewed from the direction parallel to the height T, the circularly extending wiring 610 may not circulate, may circulate once, or may circulate three or more times.

However, when the overlap increases between the bottom-surface conductors 61*b* and the first terminal electrode 621 or the second terminal electrode 622, the Q value of the inductor element L tends to decrease due to formation of the stray capacitance. From this respect, it is more preferable that at each of the position overlapping with the first terminal electrode 621 and the position overlapping with the second terminal electrode 622 as viewed from the direction parallel to the height T, the circularly extending wiring 610 do not circulate three or more times.

It is also preferable that the underlying insulation layer 65 cover the entire bottom surface 600*b*. This prevents the bottom surface 600*b* from directly interfering with the exterior, resulting in improved strength and durability of the single-layer glass plate 60.

It is also preferable that the entire bottom-surface conductors 61*b* be covered with the underlying insulation layer 65. This can suppress short circuits between the bottom-surface conductors 61*b* and between the bottom-surface conductors 61*b* and the terminal electrodes 62. Further, due to no direct interference of the bottom-surface conductors 61*b* with the exterior, damage to the bottom-surface conductors 61*b* and short circuits with external circuits can be prevented.

Further, in the inductor component 6, by comprising the through wirings 63, the wiring can be formed in the vertical direction with respect to the outer-surface conductors 61 and the terminal electrodes 62 disposed above the outer surfaces 600, improving the formation freedom of the inductor element L.

Further, in the inductor component 6, since the circularly extending wiring 610 circularly extends around the winding axis AX parallel to the bottom surface 600*b*, the winding axis AX becomes parallel to the mounting surface of the inductor component 6, with the result that magnetic flux passing through the inner diameter of the circularly extending wiring 610 as a main component of magnetic flux generated by the inductor element L does not intersect the mounting board, making it possible to reduce lowering of the Q value of the inductor element L caused by the eddy current loss and to reduce noise radiation onto the mounting board.

Hereinafter, for convenience of description, as shown in the drawings, let X direction be a direction extending parallel to the length Le of the single-layer glass plate 60 and toward the second terminal electrode 622 from the first terminal electrode 621. Further, of directions orthogonal to X direction, let Z direction be a direction extending parallel to the height T of the single-layer glass plate 60 and toward the top surface 600*t* from the bottom surface 600*b*, while let Y direction be a direction extending parallel to the width W of the single-layer glass plate 60, i.e. orthogonal to X direction and Z direction and constituting a right-handed system when arranged in the order of X, T, and Z. Further, when the orientations are not considered, etc., directions parallel to X direction, Y direction, and Z direction, respectively, may be referred to as L direction, W direction, and T direction, respectively.

From the definitions above, above the bottom surface 600*b*, which is an outer surface 600, refers to a direction that goes opposite to the z direction from the bottom surface 600*b*; and above the top surface 600*t*, which is an outer surface 600, refers to a direction that goes towards the z direction from the top surface 600*t*. The thickness of each outer-surface conductor 61 is a thickness in a direction that is orthogonal to the outer surface 600 that is positioned below the outer-surface conductors 61.

2. Structure of Each Portion

Single-Layer Glass Plate 60

The single-layer glass plate 60 functions as an insulator and a structural body of the inductor component 6. From the viewpoint of manufacturing methods, it is desirable that the single-layer glass plate 60 be made of a photosensitive glass plate, a typical example thereof being Foturan II (registered trademark of Schott AG). In particular, it is desirable that the single-layer glass plate 60 contain cerium oxide (ceria: $CeO_2$), in which case the cerium oxide becomes a sensitizing agent, and processing by photolithography is further facilitated.

However, the single-layer glass plate 60 can be processed by, for example, machining, such as drilling or sandblasting; dry/wet etching using, for example, a photoresist/metal mask; or laser processing. Therefore, a glass plate that is not photosensitive may be used. The single-layer glass plate 60 may be one in which glass paste has been sintered, or may be formed by a publicly known method, such as a float method.

The single-layer glass plate 60 is a single-layer plate member in which wirings, such as internal conductors integrated with the inside of a glass body, are not placed in the glass body. In particular, the single-layer glass plate 60 includes the outer surfaces 600 as the boundaries between the outer side portion and the inner side portion of the glass body. Since the through holes V formed in the single-layer glass plate 60 are also boundaries between the outer side portion and the inner side portion of the glass body, they are defined as the outer surfaces 600. Although the single-layer glass plate 60 is basically in an amorphous state, the single-layer glass plate 60 may include the crystallization portion. For example, when Foturan II above is used, although the dielectric constant of amorphous glass is 6.4, the dielectric constant can be reduced to 5.8 by crystallization. Therefore, it is possible to reduce the stray capacitance between conductors near the crystallization portion.

Outer-Surface Conductors 61

The outer-surface conductors 61 are wirings disposed above the corresponding one of the outer surfaces 600 of the single-layer glass plate 60, that is, on the outer side portion of the single-layer glass plate 60, and constitute at least part of the inductor element L, which is an electrical element. More specifically, the outer-surface conductors 61 include the bottom-surface conductors 61*b* that are disposed on the bottom surface 600*b* of the single-layer glass plate 60 and the top-surface conductors 61*t* that are disposed on the top surface 600*t* of the single-layer glass plate 60. Each bottom-surface conductor 61*b* and each top-surface conductor 61*t* extend in the W direction while being slightly tilted in the L direction. Therefore, the circularly extending wiring 610 has a substantially helical shape in which a change-over to a next spiral occurs at each bottom-surface conductor 61*b* and at each top-surface conductor 61*t*.

The outer-surface conductors 61 are made of conductive materials having high conductivity, such as copper, silver, gold, or an alloy thereof. The outer-surface conductors 61 may be metal films formed by, for example, plating, evaporation, or sputtering, or may be a metal sintered body in which a conductor paste has been applied and sintered. The outer-surface conductors 61 may have a multi-layer structure including a plurality of metal layers that are stacked upon each other, or may be one in which, for example, when a underlying insulation layer 65 is not included, a film made of nickel, tin, gold, or the like is formed at an outermost layer. It is desirable that the thickness of the outer-surface conductors 61 be 5 μm or more and 50 μm or less (i.e., from 5 μm to 50 μm).

It is desirable that the outer-surface conductors 61 be formed by a semi-additive method. This makes it possible to form the outer-surface conductors 61 having low electrical resistance, high precision, and high aspect. For example, the outer-surface conductors 61 can be formed as follows. First, a titanium layer and a copper layer are formed in this order by performing a sputtering method or electroless plating on the entire outer surfaces 600 of each single-layer glass plate 60 after division into individual pieces to form a seed layer, and a patterned photoresist is formed on the seed layer. Next, a copper layer is formed by electroplating on the seed layer at a cavity portion of the photoresist. Thereafter, the photoresist and the seed layer are removed by wet etching or dry etching. Therefore, the outer-surface conductors 61 that have been patterned to any shape can be formed on the outer surfaces 600 of each single-layer glass plate 60.

Terminal Electrodes 62

The terminal electrodes 62 are terminals of the inductor element L and are disposed above the outer surface 600 of the single-layer glass plates 60 and are electrically connected to the outer-surface conductors 61. As shown in FIG. 1, the terminal electrodes 62 are exposed to the outside of the inductor component 6. More specifically, the terminal electrodes 62 include the first terminal electrode 621 and the second terminal electrode 622 that are disposed on the bottom surface 600*b* of the single-layer glass plate 60, and the first terminal electrode 621 and the second terminal electrode 622 are exposed to the outside only at the bottom surface 600*b*.

However, the terminal electrodes 62 are not limited to the structure above. The number of terminal electrodes 62 may be three or more, and the terminal electrodes 62 may also be formed on a side surface adjacent to the bottom surface 600*b*, or on the top surface 600*t*. The terminal electrodes 62 can be formed by using any of the materials and manufacturing methods exemplified for the outer-surface conductors 61.

The terminal electrodes 62 need not protrude from the underlying insulation layer 65 covering the bottom-surface conductors 61*b*. A principal surface of each terminal electrode 62 may be positioned closer than the underlying insulation layer 65 to a side of the single-layer glass plate 60. In this case, mountability may be increased by forming a solder ball on the principal surface of each terminal electrode 62.

Through Wirings 63

The through wirings 63 are wirings that extend through the corresponding through holes V formed in the single-layer glass plate 60 and that are electrically connected to the corresponding outer-surface conductors 61, and constitute at least part of the inductor element L. In particular, the circularly extending wiring 610 including the outer-surface conductors 61 and the through wirings 63 has a substantially helical shape circularly extending around the winding axis AX and constitutes the main portion of the inductor element L. The through wirings 63 can be formed in the through holes V previously formed in the single-layer glass plate 60 by using any of the materials and manufacturing methods exemplified for the outer-surface conductors 61.

Underlying Insulation Layer 65

The underlying insulation layer 65 is a member that has the role of preventing damage to the outer-surface conductors 61 from occurring by protecting the outer-surface conductors 61 from external forces, and the role of increasing the insulation property of the outer-surface conductors 61. It is desirable that the underlying insulation layer 65 be, for example, an inorganic film made of an oxide, a nitride, or an oxynitride of, for example, silicon or hafnium, having excellent insulation property and capable of being easily thinned However, the underlying insulation layer 65 may be a resin film made of, for example, epoxy or polyimide that allows easier formation thereof. In particular, it is desirable that the underlying insulation layer 65 be made of a low dielectric constant material, whereby the stray capacitance formed between the bottom-surface conductors 61*b* and the terminal electrodes 62 can be reduced.

As shown in FIGS. 1 and 2, the underlying insulation layer 65 may cover the single-layer glass plate 60 and the top-surface conductors 61*t* on the top surface 600*t*. This makes it possible to form a pickup surface of a mounting device when mounting the inductor component 6 onto the mounting board.

By using the underlying insulation layer 61, it is possible to adjust, for example, the heights of formation and the degree of close contact of the outer-surface conductors 61 and the terminal electrodes 62, and the electrical characteristics of the inductor element L.

The underlying insulation layer 65 can be formed by, for example, laminating with a resin film, such as ABF GX-92 (manufactured by Ajinomoto Fine-Techno Co., Inc.), or applying, subjecting to thermosetting, etc. a paste-like resin.

In the inductor component 6, the underlying insulation layer 65 is disposed on the bottom-surface conductors 61*b*, and the terminal electrodes 62 are disposed on the underlying insulation layer 65. In this way, by forming the outer-surface conductors 61 and the terminal electrodes 62 in different layers, it is possible to design a layout of the outer-surface conductors 61 and the terminal electrodes 62 with greater freedom.

Via through wirings formed in the underlying insulation layer 65, the terminal electrodes 62 can be electrically connected to the bottom-surface conductors 61*b* and the through wirings 63. Instead of disposing only the terminal electrodes 62 on the underlying insulation layer 65, as a re-wiring layer, a wiring that is electrically connected to the bottom-surface conductors 61*b* and the through wirings 63 may be disposed at the underlying insulation layer 65. This allows the inductor element L to be designed with greater freedom.

3. Processing Method of Single-Layer Glass Plate 60

In the inductor component 6, the single-layer glass plate 60 is a processed body including previously formed through holes V, etc., prior to forming the inductor element L including, for example, the outer-surface conductors 61, the terminal electrodes 62, and the through wirings 63. In processing the single-layer glass plate 60, although it is possible to use publicly known methods including the above-described methods, it is most desirable to perform the processing using photosensitive glass, thereby allowing the processing to be performed with high precision. The processing method using photosensitive glass is described below.

(1) Preparation of Board

First, a photosensitive glass board, which is an assembly of portions that become the single-layer glass plates 60, is prepared. For the photosensitive glass board, for example, Foturan II can be used. In general, the photosensitive glass board contains an oxide of silicon, lithium, aluminum, cerium, or the like to allow photolithography with high precision.

(2) Exposure

Next, portions of the prepared photosensitive glass board where, for example, the through holes, the cavities, the crystallization portion, and the grooved portions are to be formed are irradiated with, for example, ultraviolet light having a wavelength of approximately 310 nm. The irradiation with ultraviolet light causes, for example, metal ions, such as cerium ions, in the photosensitive glass to be oxidized by light energy to discharge electrons. Here, the final processing depth of the single-layer glass plates 60 can be controlled by adjusting the irradiation amount of ultraviolet light in accordance with the thickness of the photosensitive glass board. For example, by setting the irradiation amount to a large amount, it is possible to form the through holes V that extend up to the top surface 600*t* from the bottom surface 600*b* of each single-layer glass plate 60, whereas, by adjusting the irradiation amount to a small amount, it is possible to form the non-through holes, such as the cavities and the grooved portions.

As an exposure device used in irradiating the photosensitive glass board with ultraviolet light, a contact aligner or a stepper that allows ultraviolet light having a wavelength of approximately 310 nm to be obtained can be used. Alternatively, a laser irradiation device including a femtosecond laser can be used as a light source. When a femtosecond laser is used, by condensing laser light in an internal portion of the photosensitive glass board, it is possible to discharge electrons from metal oxide only at a light-condensing portion. That is, it is possible to photosensitize only the internal portion without photosensitizing a surface of a laser-light irradiation portion of the photosensitive glass board.

Therefore, each single-layer glass plate 60 is designed with greater freedom. For example, processing becomes possible for inner portions that are not exposed at the bottom surface 600*b* and the top surface 600*t*, which are surfaces where the outer-surface conductors 61 of the inductor component 6 are formed, that is, for portions of the photosensitive glass board other than the exposed surfaces.

(3) Firing

The photosensitive glass board after the exposure above is fired. Specifically, the photosensitive glass board is fired at temperatures in two stages, for example, first, at a temperature near 500° C. Therefore, in the ultraviolet-light irradiation portion of the photosensitive glass board, ions, such as silver ions, gold ions, or copper ions, are reduced by discharged electrons to form a nano-cluster of metal atoms. Next, the photosensitive glass board is fired at a temperature near 560° C. Therefore, the nano-cluster of metal atoms becomes a crystalline nucleus and a crystal phase of, for example, lithium metasilicate is deposited in the vicinity of the crystalline nucleus. The crystal phase of, for example, lithium metasilicate easily dissolves in hydrofluoric acid, and this characteristic is used in the next etching step.

In uniformly depositing the crystal phase above in a plane of the photosensitive glass board, the temperature distribution inside a firing furnace needs to be uniform and is desirably within ±3° C.

(4) Etching

After the firing, the etching step using a hydrofluoric acid aqueous solution is performed. It is desirable that the concentration of hydrofluoric acid aqueous solution be, for example, 5 to 10%. In the etching step, the entire photosensitive glass board after the firing above is immersed in the hydrofluoric acid aqueous solution. Therefore, only the crystal phase inside the board is etched and the through holes or the non-through holes are formed. For the purpose of smoothening the surface of the etched photosensitive glass board, the hydrofluoric acid aqueous solution may contain an acid other than hydrofluoric acid, such as hydrochloric acid or nitric acid.

When the crystallization portion is to be formed in each single-layer glass plate 60, for example, a portion of the crystal phase that becomes the crystallization portion may be covered with a barrier layer that is resistant to a hydrofluoric acid aqueous solution to prevent the hydrofluoric acid aqueous solution from being immersed in the crystal phase. After the step above, if necessary, the thickness of the photosensitive glass board may be adjusted by grinding the photosensitive glass board.

(5) Formation of Conductors

The outer-surface conductors 61, the through wirings 63, etc., are formed at the corresponding outer surfaces of the photosensitive glass board after the etching step above by, for example, a semi-additive method. The outer-surface conductors 6 and the through wirings 63 may be formed from a single seed layer, or may be formed by separate steps. When the respective thicknesses of the outer-surface conductors 61 are to be different, for example, while covering a part of each outer-surface conductor 61 with the protective film 14, only exposed portions of each outer-surface conductor 61 may be further subjected to electroplating, or a seed layer may be formed again to form a multi-layered conductor layer.

After forming the conductors, the conductors are coated or laminated with a resin to form the underlying insulation layer 65, and the terminal electrodes 62 are formed on the underlying insulation layer 65 by the same method as described above. Afterward, the photosensitive glass board is divided into individual pieces by, for example, using a dicing blade, so that an inductor component 6 including the single-layer glass plate 60 is completed.

In the manufacturing method above, since after sintering each single-layer glass plate 60 of the inductor component 6, the conductors, such as the outer-surface conductors 61, the terminal electrodes 62, and the through wirings 63 are formed, it is possible to reduce the influence caused by the firing.

In the above, although, in the etching step, the crystallization portion is formed by covering a portion of the crystal phase with a barrier layer that is resistant to a hydrofluoric acid aqueous solution, it is not limited thereto. For example, it is possible to, by irradiating with ultraviolet light again the photosensitive glass board after the formation of conductors or the inductor component 6 after the division into pieces, slightly crystalize the irradiation portion and form the crystallization portion. This causes the crystallization portion to be formed with greater freedom.

4. Modifications

Although, as the embodiment, the inductor component 6 has been described, the inductor component 6 may have additional structures below that have not been described above. For example, in the inductor component 6, the single-layer glass plate 60 may include a reinforcing portion that is harder than the vicinity thereof. An electronic component, such as the inductor component 6, tends to be damaged due to an external force or a thermal shock applied to the inductor component 6 during a manufacturing process or after mounting. In particular, at interfaces between elements having different physical properties, that is, between the single-layer glass plate 60, the outer-surface conductors 61, the terminal electrodes 62, and the through wirings 63, stress tends to concentrate and cracks tend to be produced in the single-layer glass plate 60 with the interfaces as starting points. In the structure above, since the strength can be properly reinforced by the reinforcing portion against local damages and cracks, the strength of the inductor component 6 is increased.

The reinforcing portion can be formed, for example, by using a photosensitive glass for the single-layer glass plate 60 and, similarly to the crystallization portion above, by partly crystalizing the single-layer glass plate 60. The transmittance of the reinforcing portion can be controlled as appropriate on the basis of, for example, the irradiation amount/irradiation time of ultraviolet light or heating.

In particular, it is desirable that the reinforcing portion be positioned below the outer-surface conductors 61 or below the terminal electrodes 62. This makes it possible to effectively reduce the local damages and cracks above. Further, it is more desirable that the reinforcing portion be positioned below an outer peripheral edge of each outer-surface conductor 61 or below an outer peripheral edge of each terminal electrode 62.

Although in the inductor component 6, the outer-surface conductors 61 have been a part of the inductor element L, the outer-surface conductors 61 are not limited thereto. The outer-surface conductors 61 may be a part of electric elements other than the inductor element L. For example, the outer-surface conductors 61 may be a part of a capacitor element. In this case, the inductor component becomes an LC composite filter component including also the capacitor element.

Similarly, the inductor component 6 may include a plurality of electric elements. For example, the inductor component 6 may include two or more inductor elements, two more capacitor elements, or a combination thereof.

The manufacturing method of the inductor component 6 can also be changed as appropriate. For example, in the manufacturing method described above, individual pieces of single-layer glass plates may be formed by cutting the photosensitive glass board by a photolithography method, the photosensitive glass board having the outer-surface conductors formed thereon.

According to the manufacturing method above, it is possible to cut the photosensitive glass board with high precision while reducing chipping when dividing the photosensitive glass board into pieces. Since this method does not cause a physical shock to be applied to the photosensitive glass board at the time of dicing unlike when a dicing blade is used, it is possible to suppress micro-cracks from being produced in the single-layer glass plates. Further, compared to when a dicing blade is used, it is possible to reduce a cutting margin when dividing the photosensitive glass board into pieces, and to increase the number of single-layer glass plates that can be obtained from a photosensitive glass board of the same size.

Although the inductor component 6 has included one single-layer glass plate 60, the structure may be such that a plurality of single-layer glass plates are joined and stacked together. An example of a method of joining the single-layer glass plates to each other includes using a photosensitive glass for the single-layer glass plate and activating the surface of the photosensitive glass by wet etching or dry etching, whereby the glass plates can be directly joined to each other. The single-layer glass plates may be joined to each other by interposing an adhesive layer, such as a thermosetting resin layer or a thermoplastic resin layer, between the top surface of a single-layer glass plate and the bottom surface of another single-layer glass plate.

At this time, for example, the outer-surface conductors may be formed on a single-layer glass plate before the joining or may be formed on single-layer glass plates joined together. Without being limited thereto, grooved portions may be formed on the top surface of the joined single-layer glass plates or single-layer glass plates may be joined together after formation of the grooved portions on the top surface, after which the outer-surface conductors may be formed in the grooved portions. By forming the outer-surface conductors in the grooved portions after joining the single-layer glass plates, two single-layer glass plates can come into more intimate contact with each other, which is desirable. Even if an adhesive layer is used, spaces between the single-layer glass plates can be filled due to plastic deformation of the adhesive layer, which is desirable.

Although the inductor component 6 has been a surface-mount-type electronic component, this is not limitative. For example, the inductor component 6 may be a three-dimensional mounting electronic component.

The various features described above can be individually added, deleted, and changed. Further, publicly known structures can be added to, deleted from, and changed from these modes.

The present disclosure is not limited to the embodiment described above and may be changed in design without departing from the spirit of the present disclosure. For example, respective feature points of the reference examples described below may variously be incorporated in the present disclosure.

FIRST REFERENCE EXAMPLE

Figure 3:
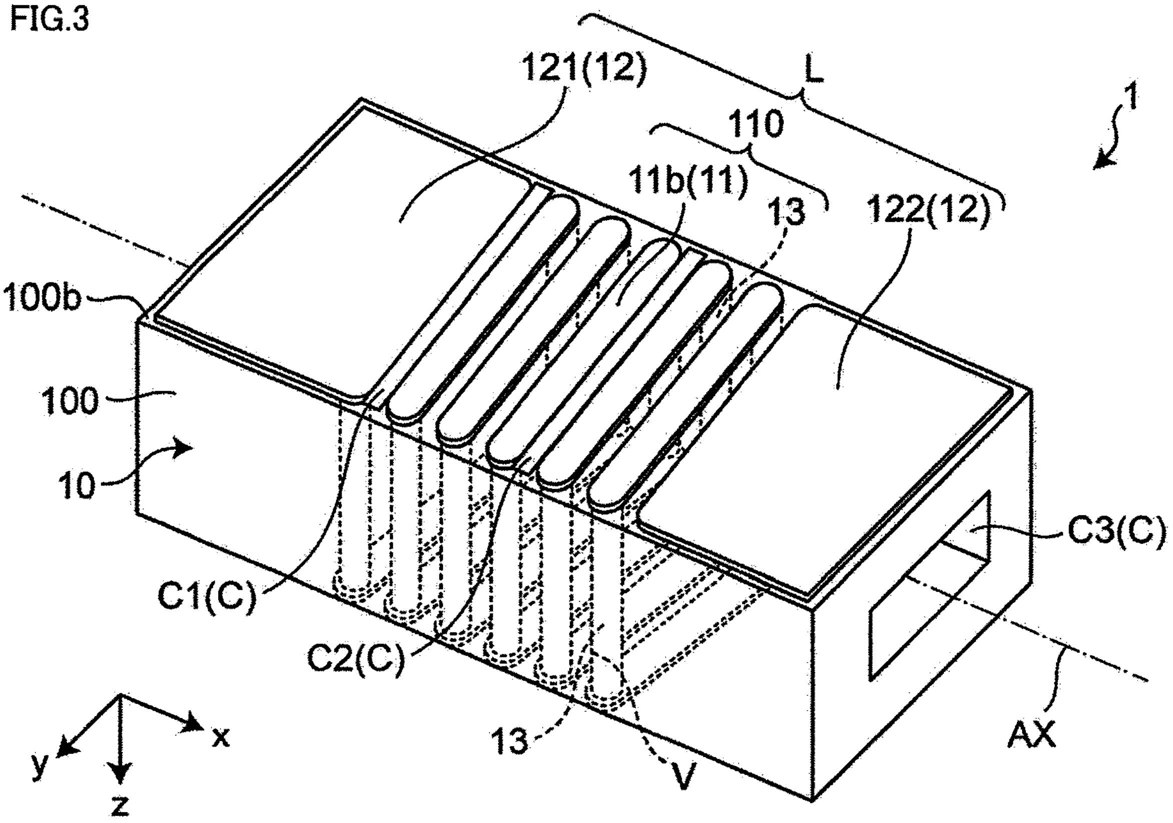
FIG. 3 is a schematic perspective view of an inductor component as viewed from its bottom surface side.
Figure 5:
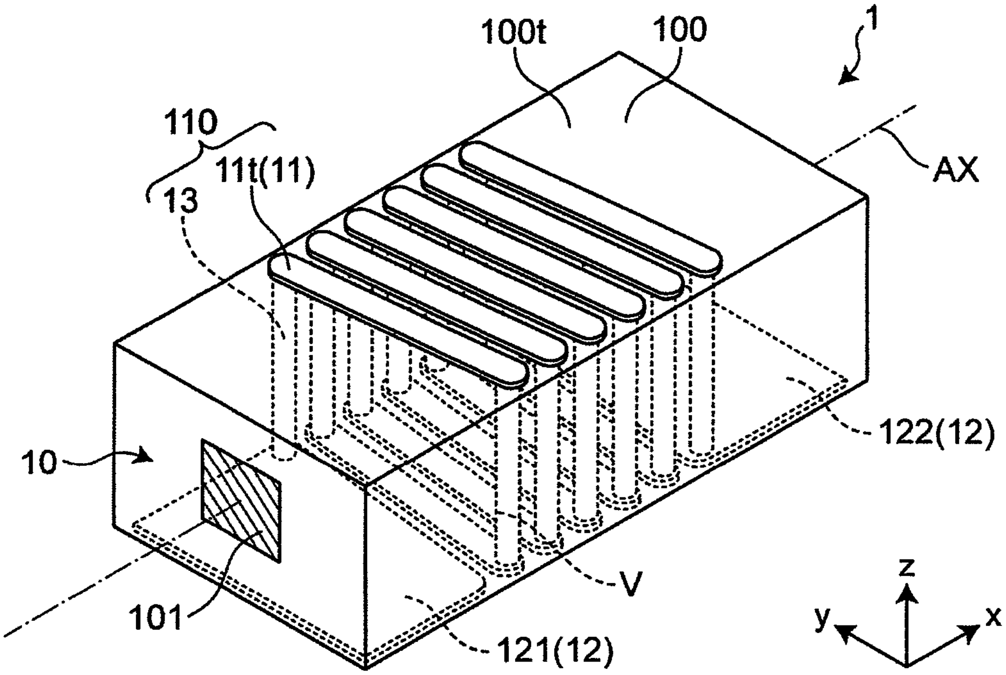
FIG. 5 is a schematic perspective view of the inductor component as viewed from a top surface.

An inductor component 1 according to a first reference example is described below. FIG. 3 is a schematic perspective view of the inductor component 1 as viewed from a bottom surface. FIG. 5 is a schematic perspective view of the inductor component 1 as viewed from a top surface.

1. General Structure

A general structure of the inductor component 1 is described. The inductor component 1 is a surface-mount-type electronic component that includes, as an electrical element, for example, an inductor element L used in a high-frequency signal transmission circuit. The inductor component 1 includes a single-layer glass plate 10, outer-surface conductors 11 that are each disposed above a corresponding one of outer surfaces 100 of the single-layer glass plate 10 and that are at least part of the inductor element L, and terminal electrodes 12 that are terminals of the inductor element L, the terminal electrodes 12 being disposed above a bottom surface 100*b* of the single-layer glass plate 10 and being electrically connected to the outer-surface conductors 11.

Due to the structure above, since, in the inductor component 1, the outer-surface conductors 11 and the terminal electrodes 12 are disposed above the corresponding outer surfaces 100 of the single-layer glass plate 10, the outer-surface conductors 11 and the terminal electrodes 12 are not placed in the single-layer glass plate 10. Therefore, the inductor component 1 makes it possible to reduce the influence of firing.

The inductor component 1 further includes through wirings 13 that are at least part of the inductor element L, the through wirings 13 extending through holes V formed in the single-layer glass plate 10 and being electrically connected to the outer-surface conductors 11.

Due to the structure above, in the inductor component 1, it is possible to form wirings in a vertical direction with respect to the outer-surface conductors 11 and the terminal electrodes 12, which are disposed above the corresponding outer surfaces 100, and the inductor element L is formed with greater freedom.

In the inductor component 1, the outer surfaces 100 of the single-layer glass plate 10 include the bottom surface 100*b* that is one principal surface of the single-layer glass plate 10, and the terminal electrodes 12 include a first terminal electrode 121 and a second terminal electrode 122, which are input/output terminals of the inductor element L. Further, in the inductor component 1, at locations above the bottom surface 100*b*, the first terminal electrode 121 and the second terminal electrode 122 each have a shape including a principal surface that is parallel to the bottom surface 100*b*.

Due to the structure above, since the inductor component 1 includes the input/output terminals of the inductor element L, each having a surface that allows solder to adhere in a direction parallel to the bottom surface 100*b*, on a side of the bottom surface 100*b*, the inductor component 1 is a surface-mount-type electronic component that allows surface mounting with the bottom surface 100*b* being a mount surface and that can reduce a mounting area.

In the inductor component 1, the outer surfaces 100 further include a top surface 100*t* that is positioned on a back side of the bottom surface 100*b*, and the outer-surface conductors 11 include bottom-surface conductors 11*b* that are disposed above the bottom surface 100*b* and top-surface conductors 11*t* that are disposed above the top surface 100*t*. The bottom-surface conductors 11*b* and the top-surface conductors 11*t* are electrically connected to each other by the through wirings 13. Further, in the inductor component 1, a circularly extending wiring 110 that is formed from the bottom-surface conductors 11*b*, the top-surface conductors 11*t*, and the through wirings 13 circularly extends around a winding axis AX that is parallel to the bottom surface 100*b*.

Due to the structure above, since the winding axis AX is parallel to the mount surface of the inductor component 1, magnetic flux that is a main component of magnetic flux which is generated by the inductor element L and which passes the inside diameter of the circularly extending wiring 110 does not intersect a mounting board, so that it is possible to reduce reduction in a Q value of the inductor element L caused by an eddy current loss and to reduce noise emission with respect to the mounting board.

In the inductor component 1, the single-layer glass plate 10 includes cavities C. Therefore, the effective dielectric constant is lower than that of a single-layer glass plate 10 that does not include cavities C, so that a stray capacitance that is generated between any of the outer-surface conductors 11, any of the terminal electrodes 12, any of the through wirings 13, and a wiring pattern on the mounting board can be reduced, and, in particular, reduction in self-resonant frequency of the inductor element L can be suppressed from occurring.

By performing a processing method (described below), it is possible to form the cavities C in any shape and in any place in the single-layer glass plate 10. For example, the inductor component 1 includes a cavity C1 along a periphery of the terminal electrode 12. In the inductor component 1, the circularly extending wiring 110 circularly extends at least two times around the wiring axis AX, and the single-layer glass plate 10 includes a cavity C2 between adjacent portions of the circularly extending wiring 110. In the inductor component 1, the single-layer glass plate 10 includes a cavity C3 at a location including the winding axis AX.

In this way, at a location of the inductor component 1 where a potential difference is large and lines of electric force tend to be generated, when the cavities C1 to C3 are formed, it is possible to further effectively reduce stray capacitance. The inductor component 1 may include only one or two of the cavities C1 to C3, or may not include the cavities C1 to C3. The cavities C1 to C3 may or may not extend through the single-layer glass plate 10, or may be formed at least near the wirings. For example, the cavities C1 to C3 do not extend through the single-layer glass plate 10. The cavities C1 to C3 may be filled with a magnetic material such as a ferrite plate or a resin containing magnetic powder such as metal magnetic powder or ferrite powder.

Further, as shown in FIG. 5, in the inductor component 1, the single-layer glass plate 10 includes a crystallization portion 101 (shown by hatching). Therefore, by using the crystallization portion 101, it is possible to adjust the effective dielectric constant of the single-layer glass plate 10 and to increase or decrease a stray capacitance that is generated between any of the outer-surface conductors 11, any of the terminal electrodes 12, any of the through wirings 13, and the wiring pattern on the mounting board, in particular, to adjust the self-resonant frequency of the inductor element L.

In FIG. 5, although, in the inductor component 1, the single-layer glass plate 10 includes the crystallization portion 101 at a location including the winding axis AX, the location of the crystallization portion 101 is not limited thereto. The locations of the cavities C1 to C3 and the location of the crystallization portion 101 may be transposed. The single-layer glass plate 10 may include only the cavities C or only the crystallization portion 101, or may include neither of them. When, as in the inductor component 1, the cavity C3 and the crystallization portion 101 are both situated at locations including the winding axis AX, the depth of the cavity C3 and the depth of the crystallization portion 101 may be the same or may differ, and the cavity C1 and the crystallization portion 101 may be adjacent to each other or may be disposed apart from each other.

Figure 6:
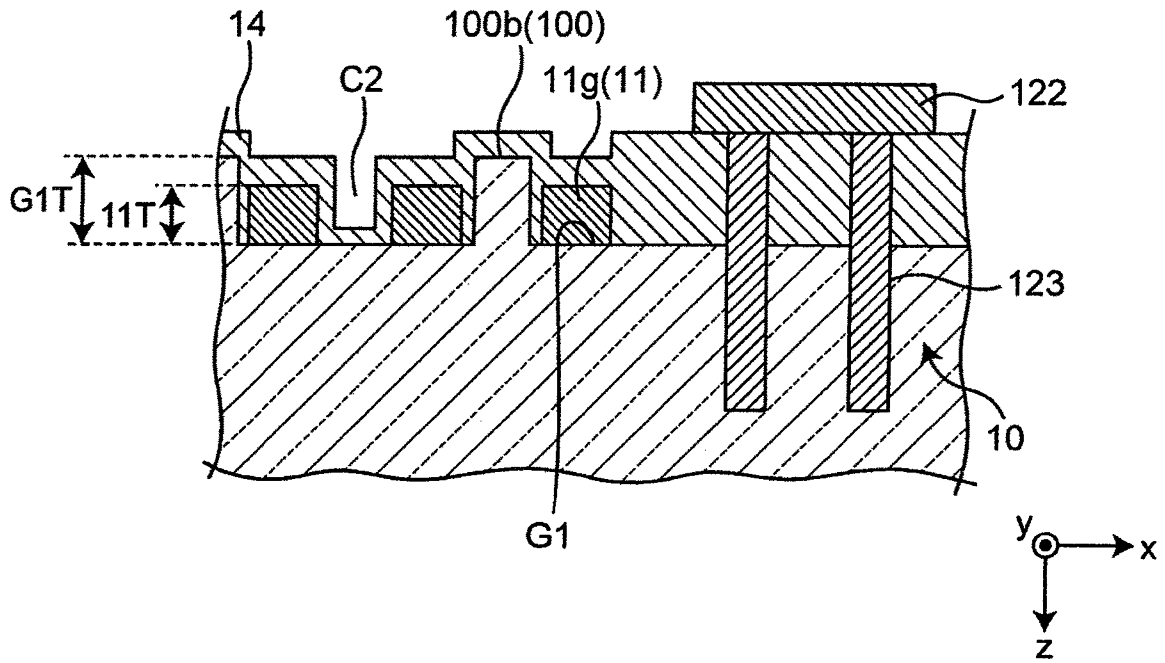
FIG. 6 is a schematic sectional view of the inductor component.
Figure 7:
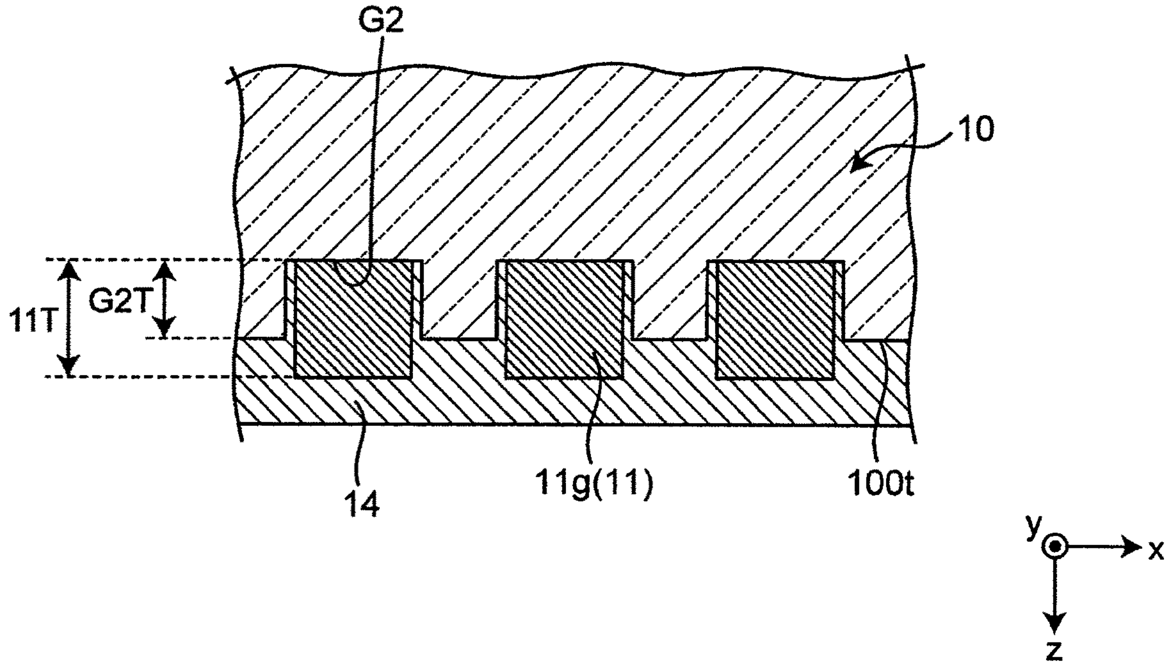
FIG. 7 is a schematic sectional view of the inductor component.

Next, the cross-sectional shape of the inductor component 1 is described. FIGS. 6 and 7 are each a schematic sectional view of the inductor component 1. Specifically, the cross section of FIG. 6 is a cross section of a portion in enlarged form near the bottom surface 100*b* on a side of the second terminal electrode 122 in a cross section including the winding axis AX and orthogonal to the bottom surface 100*b*. The cross section of FIG. 7 is a cross section of a portion in enlarged form near the top surface 100*t* in a cross section including the winding axis AX and orthogonal to the top surface 100*t*.

As shown in FIGS. 6 and 7, in the inductor component 1, the bottom surface 100*b* and the top surface 100*t*, which are the outer surfaces 100 of the single-layer glass plate 10, each have grooved portions G1 or grooved portions G2 that are each recessed with respect to a vicinity; and the outer-surface conductors 11 include grooved-portion conductors 11*g* that are each disposed in a corresponding one of the grooved portions G1 and G2.

In the structure above, since the range of formation of the grooved-portion conductors 11*g* is restricted by the grooved portions G1 and G2, the grooved-portion conductors 11*g* are formed with high precision. Therefore, in the inductor component 1, further, the precision of the shape and characteristics of the inductor element L is increased. Since the terminal electrodes 12 more easily protrude than the grooved-portion conductors 11*g* towards the side of the bottom surface 100*b*, solder is unlikely to adhere to the grooved-portion conductors 11*g* when mounting the inductor component 1 onto the mounting board, so that the mountability of the inductor component 1 is increased.

At this time, it is more desirable that portions of the single-layer glass plate 10 be disposed between adjacent grooved-portion conductors 11*g*, so that the insulation property and the electrochemical migration resistance between the adjacent grooved-portion conductors 11*g* with the portions of the single-layer glass plate 10 interposed therebetween are further increased. In this case, compared to the case in which the portions of the single-layer glass plate 10 are not interposed, it is possible to further reduce the interval between the grooved-portion conductors 11*g*, and the efficiency with which the inductance value (L value) with respect to the external shape of the inductor component 1 is obtained is increased.

As shown in FIG. 6, on the side of the bottom surface 100*b* of the inductor component 1, thickness 11T of each grooved-portion conductor 11*g* is less than depth G1T of each grooved portion G1. Therefore, since the grooved-portion conductors 11*g* do not protrude from the single-layer glass plate 10, the grooved-portion conductors 11*g* are unlikely to become damaged when, for example, manufacturing or mounting the inductor component 1.

As shown in FIG. 6, it is desirable that the inductor component 1 include a protective film 14 that covers the outer-surface conductors 11 (the grooved-portion conductors 11*g*). This makes it possible to suppress damage to the outer-surface conductors 11 from occurring. Further, in the inductor component 1, since the thickness 11T of each grooved-portion conductor 11*g* is less than the depth G1T of each grooved portion G1, the protective film 14 can be made thin. This means that, in the height dimension of the inductor component 1, the proportion that the protective film 14 occupies can be reduced. In this case, since the inside diameter of the circular shape of the circularly extending wiring 110 can be further increased, the efficiency with which the L value and the Q value per external shape of the inductor component 1 are obtained is increased.

The protective film 14 is not a required structure. The inductor component 1 may not include the protective film 14, or only a part of the inductor component 1 may include the protective film 14. For example, in particular, it is desirable that the protective film 14 cover the outer-surface conductors 11 and that the terminal electrodes 12 be exposed. Although similarly not required, by covering the single-layer glass plate 10 with the protective film 14, it is possible to reduce damage to the single-layer glass plate 10 from occurring.

As shown in FIG. 7, on a side of the top surface 100*t* of the inductor component 1, thickness 11T of each grooved-portion conductor 11*g* is greater than depth G2T of each grooved portion G2. Therefore, when the height dimension of the inductor component 1 has been prescribed, compared to outer-surface conductors 11 disposed on the top surface 100*t* instead of in the grooved portions G2, the thickness 11T of each grooved-portion conductor 11*g* can be increased and the direct current resistance of each grooved-portion conductor 11*g* can be reduced. Therefore, the efficiency with which the Q value per external shape of the inductor component 1 is obtained is increased. By increasing the thickness 11T, since the thermal capacity of each grooved-portion conductor 11*g* is also increased, the heat dissipation characteristics of the inductor element L are also improved.

Although, in the description above, the bottom surface 100*b* and the top surface 100*t* of the inductor component 1 include the corresponding grooved portions G1 and G2 having the corresponding depths G1T and G2T whose relationships with the corresponding thicknesses 11T of the grooved-portion conductors 11*g* differ from each other, the inductor component 1 is not limited to such a structure. For example, each grooved portion G1 may be formed in the top surface 100*t*, each grooved portion G2 may be formed on the side of the bottom surface 100*b*, only the grooved portions G1 or the grooved portions G2 may be formed in one or both of the bottom surface 100*b* and the top surface 100*t*.

Figure 8:
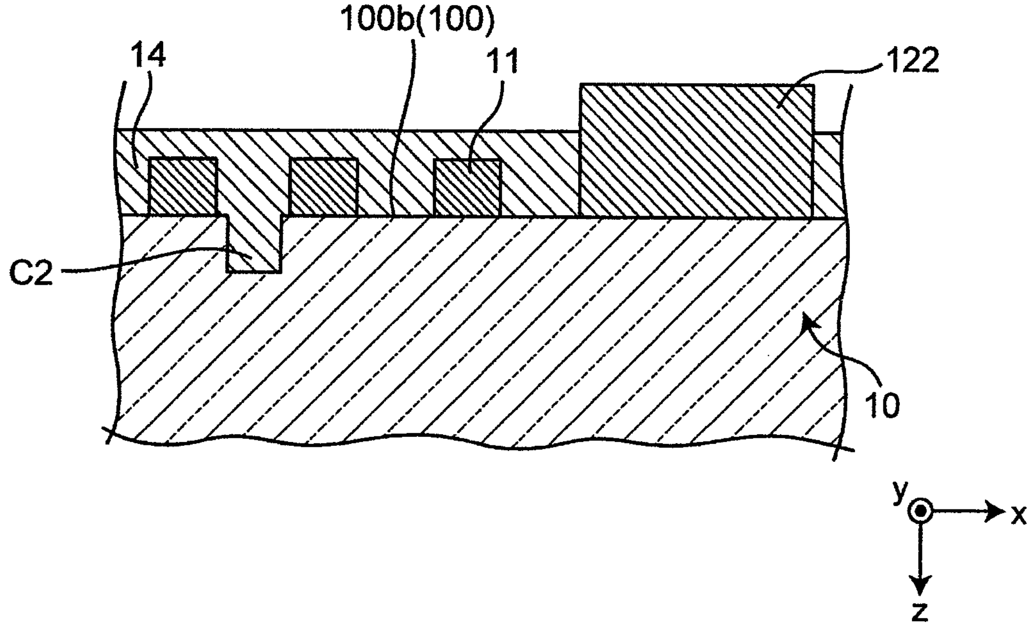
FIG. 8 is a schematic sectional view of the inductor component.

The grooved portions G1 and G2 are not required structures of the inductor component 1. FIG. 8 is a schematic sectional view of the inductor component 1 and shows a cross section corresponding to the cross section of FIG. 6. As shown in FIG. 8, the outer-surface conductors 11 need not include grooved-portion conductors 11*g*. A structure including grooved portions G1 for circular extensions of respective outer-surface conductors 11, a structure including grooved portions G2 for circular extensions of respective outer-surface conductors 11, or a structure not including grooved portions may be provided.

As shown in FIG. 6, the inductor component 1 further includes anchor sections 123 that protrude into the single-layer glass plate 10 from the second terminal electrode 122. Although not shown, a side of the first terminal electrode 121 also has a similar structure. Therefore, the fixing strength of the terminal electrodes 12 with respect to the single-layer glass plate 10 is increased. In FIG. 6, although the anchor sections 123 protrude up to an intermediate position of the single-layer glass plate 10 from the bottom surface 100*b*, the anchor sections 123 may protrude up to the top surface 100*t* and extend through the single-layer glass plate 10.

Although the anchor sections 123 are formed in holes formed in the single-layer glass plate 10, it is desirable that the anchor sections 123 fill the entire holes to further increase the fixing strength of the terminal electrodes 12 with respect to the single-layer glass plate 10.

The anchor sections 123 are not required structures of the inductor component 1. Anchor sections 123 need not be provided, or anchor sections 123 may be provided at only one of the side of the first terminal electrode 121 and the side of the second terminal electrode 122. Further, in FIG. 6, although two anchor sections 123 protrude from the second terminal electrode 122, the number of anchor sections 123 is not limited thereto, and may be one or three or more.

As illustrated in the drawings, for explanatory convenience, hereunder, a direction that is a longitudinal direction of the single-layer glass plate 10 and that goes toward the second terminal electrode 122 from the first terminal electrode 121 is defined as an x direction. Of directions that are orthogonal to the x direction, the direction that goes toward the top surface 100*t* from the bottom surface 100*b* is defined as a z direction, and the direction that is orthogonal to the x direction and the z direction and that defines a right hand system when x, y, and z are arranged in this order is defined as a y direction. When, for example, orientations are not considered, directions that are parallel to the respective x, y, and z directions may be indicated as respective L direction, W direction, and T direction.

Due to the definitions above, above the bottom surface 100*b*, which is an outer surface 100, refers to a direction that goes opposite to the z direction from the bottom surface 100*b*; and above the top surface 100*t*, which is an outer surface 100, refers to a direction that goes towards the z direction from the top surface 100*t*. The thickness of each outer-surface conductor 11, which includes, for example, each grooved-portion conductor 11*g*, is a thickness in a direction that is orthogonal to the outer surface 100 that is positioned below the outer-surface conductors 11. For example, in FIGS. 6 and 7, the thickness of each grooved-portion conductor 11*g* is a thickness of each conductor in the T direction.

2. Structure of Each Portion

Single-Layer Glass Plate 10

The single-layer glass plate 10 functions as an insulator and a structural body of the inductor component 1. From the viewpoint of manufacturing methods (described below), it is desirable that the single-layer glass plate 10 be made of a photosensitive glass plate, a typical example thereof being Foturan II (registered trademark of Schott AG). In particular, it is desirable that the single-layer glass plate 10 contain cerium oxide (ceria: $CeO_2$), in which case the cerium oxide becomes a sensitizing agent, and processing by photolithography is further facilitated.

However, the single-layer glass plate 10 can be processed by, for example, machining, such as drilling or sandblasting; dry/wet etching using, for example, a photoresist/metal mask; or laser processing. Therefore, a glass plate that is not photosensitive may be used. The single-layer glass plate 10 may be one in which glass paste has been sintered, or may be formed by a publicly known method, such as a float method.

The single-layer glass plate 10 is a single-layer plate member in which wirings, such as internal conductors integrated with the inside of a glass body, are not placed in the glass body. In particular, the single-layer glass plate 10 includes the outer surfaces 100 as the boundaries between the outer side portion and the inner side portion of the glass body. Since the through holes V, the grooved portions G1, and the grooved portions G2, formed in the single-layer glass plate 10, are also boundaries between the outer side portion and the inner side portion of the glass body, they are defined as the outer surfaces 100.

Although the single-layer glass plate 10 is basically in an amorphous state, the single-layer glass plate 10 may include the crystallization portion 101. For example, when Foturan II above is used, although the dielectric constant of amorphous glass is 6.4, the dielectric constant can be reduced to 5.8 by crystallization. Therefore, it is possible to reduce the parasitic capacitance between conductors near the crystallization portion 101.

Outer-Surface Conductors 11

The outer-surface conductors 11 are wirings disposed above the corresponding one of the outer surfaces 100 of the single-layer glass plate 10, that is, on the outer side portion of the single-layer glass plate 10, and constitute at least part of the inductor element L, which is an electrical element. More specifically, the outer-surface conductors 11 include the bottom-surface conductors 11*b* that are disposed on the bottom surface 100*b* of the single-layer glass plate 10 and the top-surface conductors 11*t* that are disposed on the top surface 100*t* of the single-layer glass plate 10. Each bottom-surface conductor 11*b* has a shape extending in the W direction and each top-surface conductor 11*t* extends in the W direction while being slightly tilted in the L direction. Therefore, the circularly extending wiring 110 has a substantially helical shape in which a change-over to a next spiral occurs at each top-surface conductor 11*t*.

The outer-surface conductors 11 are made of conductive materials having high conductivity, such as copper, silver, gold, or an alloy thereof. The outer-surface conductors 11 may be metal films formed by, for example, plating, evaporation, or sputtering, or may be a metal sintered body in which a conductor paste has been applied and sintered. The outer-surface conductors 11 may have a multi-layer structure including a plurality of metal layers that are stacked upon each other, or may be one in which, for example, when a protective film 14 is not included, a film made of nickel, tin, gold, or the like is formed at an outermost layer. It is desirable that the thickness of the outer-surface conductors 11 be 5 μm or more and 50 μm or less (i.e., from 5 μm to 50 μm).

It is desirable that the outer-surface conductors 11 be formed by a semi-additive method. This makes it possible to form the outer-surface conductors 11 having low electrical resistance, high precision, and high aspect. For example, the outer-surface conductors 11 can be formed as follows. First, a titanium layer and a copper layer are formed in this order by performing a sputtering method or electroless plating on the entire outer surfaces 100 of each single-layer glass plate 10 after division into individual pieces to form a seed layer, and a patterned photoresist is formed on the seed layer. Next, a copper layer is formed by electroplating on the seed layer at a cavity portion of the photoresist. Thereafter, the photoresist and the seed layer are removed by wet etching or dry etching. Therefore, the outer-surface conductors 11 that have been patterned to any shape can be formed on the outer surfaces 100 of each single-layer glass plate 10.

Terminal Electrodes 12

The terminal electrodes 12 are terminals of the inductor element L and are disposed above the outer surface 100 of the single-layer glass plates 10 and are electrically connected to the outer-surface conductors 11. As shown in FIG. 5, the terminal electrodes 12 are exposed to the outside of the inductor component 1. More specifically, the terminal electrodes 12 include the first terminal electrode 121 and the second terminal electrode 122 that are disposed on the bottom surface 100*b* of the single-layer glass plate 10, and the first terminal electrode 121 and the second terminal electrode 122 are exposed to the outside only at the bottom surface 100*b*.

However, the terminal electrodes 12 are not limited to the structure above. The number of terminal electrodes 12 may be three or more, and the terminal electrodes 12 may also be formed on a side surface adjacent to the bottom surface 100*b*, or on the top surface 100*t*. The terminal electrodes 12 can be formed by using any of the materials and manufacturing methods exemplified for the outer-surface conductors 11.

For example, as shown in FIG. 6, by forming the terminal electrodes 12 on the outer surface 100 of the single-layer glass plate 10 at locations above the outer-surface conductors 11, the terminal electrodes 12 may protrude above the outer-surface conductors 11. For example, as shown in FIG. 7, the terminal electrodes 12 may protrude above the outer-surface conductors 11 by making the terminal electrodes 12 thicker than the outer-surface conductors 11. When the outer-surface conductors 11 are covered with the protective film 14, the terminal electrodes 12 need not protrude from the protective film 14. A principal surface of each terminal electrode 12 may be positioned closer than the protective film 14 to a side of the single-layer glass plate 10. In this case, mountability may be increased by forming a solder ball on the principal surface of each terminal electrode 12.

Although the inductor component 1 includes the anchor sections 123 that protrude into the single-layer glass plate 10 from the terminal electrodes 12, the anchor sections 123 may be formed by, for example, a method in which, prior to forming the terminal electrodes 12, non-through holes or through holes are formed by performing a processing method (described later) on the single-layer glass plate 10, and conductors are formed in the non-through holes or the through holes by using any of the materials and manufacturing methods exemplified for the outer-surface conductors 11. For example, a seed layer may be formed in the non-through holes or the through holes and in a terminal electrode formation region in the vicinity thereof to form conductors that are caused to fill the non-through holes or the through holes by performing electroplating. The terminal electrodes 12 and the anchor sections 123 may be separately formed, or may be formed using the same seed layer to integrally form the terminal electrodes 12 and the anchor sections 123, so that the terminal electrodes 12 are those subjected to high anchoring effect.

Through Wirings 13

The through wirings 13 are wirings that extend through the corresponding through holes V formed in the single-layer glass plate 10 and that are electrically connected to the corresponding outer-surface conductors 11, and constitute at least part of the inductor element L. In particular, the circularly extending wiring 110 including the outer-surface conductors 11 and the through wirings 13 has a substantially helical shape circularly extending around the winding axis AX and constitutes the main portion of the inductor element L. By performing a method (described below), the through wirings 13 can be formed in the through holes V previously formed in the single-layer glass plate 10 by using any of the materials and manufacturing methods exemplified for the outer-surface conductors 11.

In FIGS. 3 and 5, although the through wirings 13 are formed in the through holes V formed in a direction orthogonal to the bottom surface 100*b* and the top surface 100*t*, it is not limited thereto. For example, in each single-layer glass plate 10 after the division into individual pieces, the through holes V may be formed in a direction parallel to the bottom surface 100*b* and the top surface 100*t* to form wirings that extend in the direction parallel to the bottom surface 100*b* and the top surface 100*t*.

Protective Film 14

The protective film 14 is a member that has the role of preventing damage to the outer-surface conductors 11 from occurring by protecting the outer-surface conductors 11 from external forces, and the role of increasing the insulation property of the outer-surface conductors 11. It is desirable that the protective film 14 be, for example, an inorganic film made of an oxide, a nitride, or an oxynitride of, for example, silicon or hafnium, having excellent insulation property and capable of easily being made thin. However, the protective film 14 may be a resin film made of, for example, epoxy or polyimide that allows easier formation thereof.

As shown in FIG. 7, the protective film 14 may cover the single-layer glass plate 10 and the outer-surface conductors 11 (the grooved-portion conductors 11*g*) on the top surface 100*t*. This makes it possible to form a pickup surface of a mounting device when mounting the inductor component 1 onto the mounting board.

3. Processing Method of Single-Layer Glass Plate 10

In the inductor component 1, prior to forming the inductor element L including, for example, the outer-surface conductors 11, the terminal electrodes 12, and the through wirings 13, the single-layer glass plate 10 is a processing body including previously formed through holes V, previously formed cavities C, a previously formed crystallization portion 101, previously formed grooved portions G1 and G2, etc. In processing the single-layer glass plate 10, although it is possible to use publicly known methods including the above-described methods, it is most desirable to perform the processing using photosensitive glass, thereby allowing the processing to be performed with high precision. The processing method using photosensitive glass is described below.

(1) Preparation of Board

First, a photosensitive glass board, which is an assembly of portions that become the single-layer glass plates 10, is prepared. For the photosensitive glass board, for example, Foturan II can be used. In general, the photosensitive glass board contains an oxide of silicon, lithium, aluminum, cerium, or the like to allow photolithography with high precision.

(2) Exposure

Next, portions of the prepared photosensitive glass board where, for example, the through holes V, the cavities C, the crystallization portion 101, and the grooved portions G1 and G2 are to be formed are irradiated with, for example, ultraviolet light having a wavelength of approximately 310 nm. The irradiation with ultraviolet light causes, for example, metal ions, such as cerium ions, in the photosensitive glass to be oxidized by light energy to discharge electrons. Here, the final processing depth of the single-layer glass plates 10 can be controlled by adjusting the irradiation amount of ultraviolet light in accordance with the thickness of the photosensitive glass board. For example, by setting the irradiation amount to a large amount, it is possible to form the through holes V that extend up to the top surface 100*t* from the bottom surface 100*b* of each single-layer glass plate 10, whereas, by adjusting the irradiation amount to a small amount, it is possible to form the non-through holes, such as the cavities C and the grooved portions G1 and G2.

As an exposure device used in irradiating the photosensitive glass board with ultraviolet light, a contact aligner or a stepper that allows ultraviolet light having a wavelength of approximately 310 nm to be obtained can be used. Alternatively, a laser irradiation device including a femtosecond laser can be used as a light source. When a femtosecond laser is used, by condensing laser light in an internal portion of the photosensitive glass board, it is possible to discharge electrons from metal oxide only at a light-condensing portion. That is, it is possible to photosensitize only the internal portion without photosensitizing a surface of a laser-light irradiation portion of the photosensitive glass board.

Therefore, each single-layer glass plate 10 is designed with greater freedom. For example, as with the locations where the cavity C3 and the crystallization portion 101 of the inductor component 1 are formed, inner portions that are not exposed at the bottom surface 100*b* and the top surface 100*t*, which are surfaces where the outer-surface conductors 11 are formed, that is, portions of the photosensitive glass board other than the exposed surfaces can be processed.

(3) Firing

The photosensitive glass board after the exposure above is fired. Specifically, the photosensitive glass board is fired at temperatures in two stages, for example, first, at a temperature near 500° C. Therefore, in the ultraviolet-light irradiation portion of the photosensitive glass board, ions, such as silver ions, gold ions, or copper ions, are reduced by discharged electrons to form a nano-cluster of metal atoms. Next, the photosensitive glass board is fired at a temperature near 560° C. Therefore, the nano-cluster of metal atoms becomes a crystalline nucleus and a crystal phase of, for example, lithium metasilicate is deposited in the vicinity of the crystalline nucleus. The crystal phase of, for example, lithium metasilicate easily dissolves in hydrofluoric acid, and this characteristic is used in the next etching step.

In uniformly depositing the crystal phase above in a plane of the photosensitive glass board, the temperature distribution inside a firing furnace needs to be uniform and is desirably within ±3° C.

(4) Etching

After the firing, the etching step using a hydrofluoric acid aqueous solution is performed. It is desirable that the concentration of hydrofluoric acid aqueous solution be, for example, 5 to 10%. In the etching step, the entire photosensitive glass board after the firing above is immersed in the hydrofluoric acid aqueous solution. Therefore, only the crystal phase inside the board is etched and the through holes or the non-through holes are formed. For the purpose of smoothening the surface of the etched photosensitive glass board, the hydrofluoric acid aqueous solution may contain an acid other than hydrofluoric acid, such as hydrochloric acid or nitric acid.

When the crystallization portion 101 is to be formed in each single-layer glass plate 10, for example, a portion of the crystal phase that becomes the crystallization portion 101 may be covered with a barrier layer that is resistant to a hydrofluoric acid aqueous solution to prevent the hydrofluoric acid aqueous solution from being immersed in the crystal phase. After the step above, if necessary, the thickness of the photosensitive glass board may be adjusted by grinding the photosensitive glass board.

(5) Formation of Conductors

For example, the outer-surface conductors 11, the terminal electrodes 12, and the through wirings 13 are formed at the corresponding outer surfaces of the photosensitive glass board after the etching step above by, for example, a semi-additive method. The outer-surface conductors 11, the terminal electrodes 12, and the through wirings 13 may be formed from a single seed layer, or may be formed by separate steps. When the thickness of the outer-surface conductors 11 and the thickness of the terminal electrodes 12 are to be different, for example, while covering the outer-surface conductors 11 with the protective film 14, only portions that become the terminal electrodes 12 may be further subjected to electroplating, or a seed layer may be formed again to form a multi-layered conductor layer.

After forming the conductors, if necessary, the conductors are coated with or laminated with a resin to form the protective film 14, and the photosensitive glass board is divided into individual pieces by, for example, using a dicing blade, so that an inductor component 1 including the single-layer glass plates 10 is completed.

In the manufacturing method above, since after sintering each single-layer glass plate 10 of the inductor component 1, the conductors, such as the outer-surface conductors 11, the terminal electrodes 12, and the through wirings 13 are formed, it is possible to reduce the influence caused by the firing.

In the above, although, in the etching step, the crystallization portion 101 is formed by covering a portion of the crystal phase with a barrier layer that is resistant to a hydrofluoric acid aqueous solution, it is not limited thereto. For example, it is possible to, by irradiating with ultraviolet light again the photosensitive glass board after the formation of conductors or the inductor component 1 after the division into pieces, slightly crystalize the irradiation portion and form the crystallization portion 101. This causes the crystallization portion 101 to be formed with greater freedom.

4. Modifications

Although, as the first reference example, the inductor component 1 has been described, the inductor component 1 may have additional structures below that have not been described above.

Low Transmittance Portion 102

Figure 9:
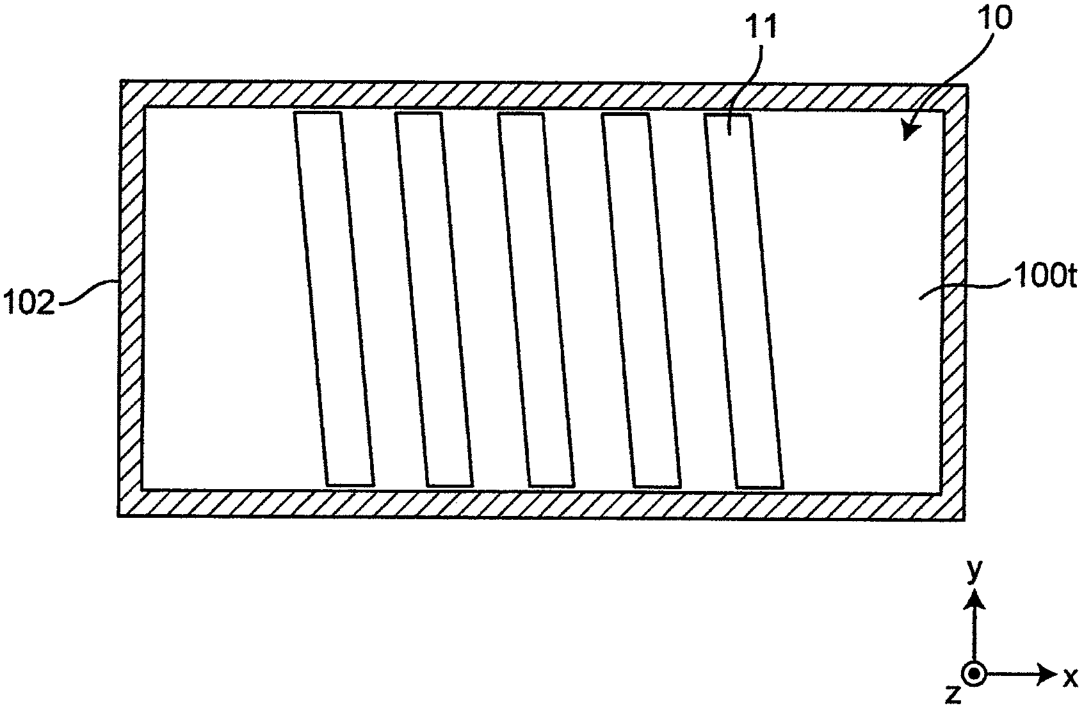
FIG. 9 is a schematic top view of the inductor component.
Figure 10:
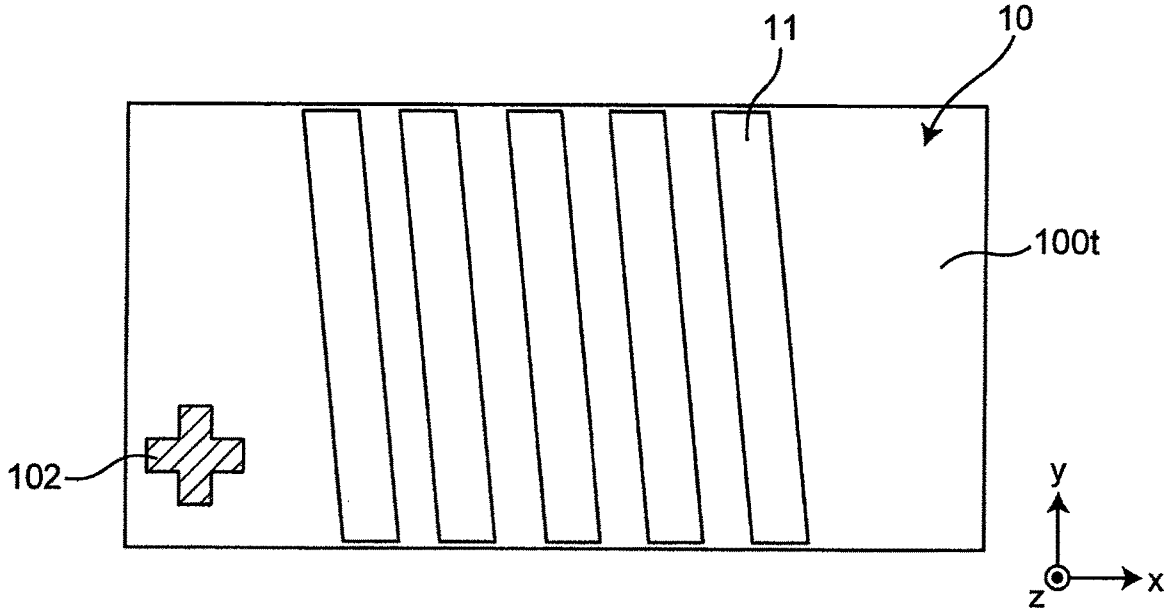
FIG. 10 is a schematic top view of the inductor component.
Figure 11:
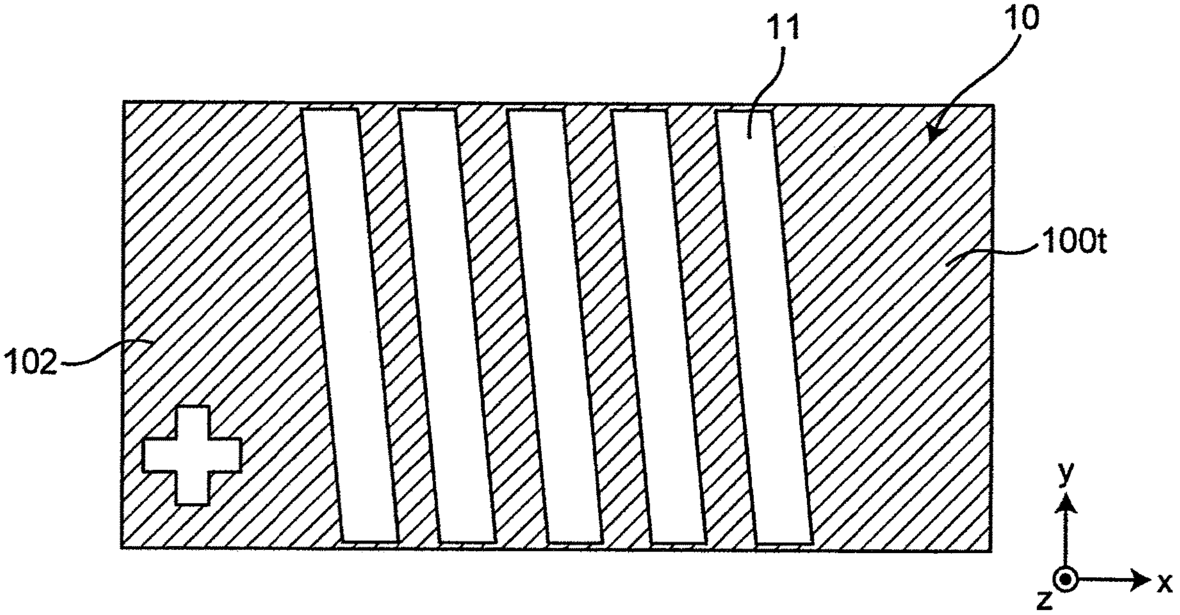
FIG. 11 is a schematic top view of the inductor component.

FIGS. 9, 10, and 11 are each a schematic top view of the inductor component 1. The inductor component 1 includes a low transmittance portion 102 (shown by hatching) on at least a part of an outer surface 100 of the single-layer glass plate 10, the low transmittance portion 102 having a light transmittance that is lower than that of the vicinity thereof. Therefore, the single-layer glass plate 10 having high light transmittance and low visibility has improved visibility and is easy to handle when manufacturing and using the inductor component 1. The low transmittance portion 102 has a light transmittance that is lower than that of the vicinity thereof with regard to at least some of the wavelengths, and has low light transmittance with regard to, for example, a wavelength of infrared light, visible light, or ultraviolet light, or a plurality of such wavelengths.

The low transmittance portion 102 can be formed, for example, by using a photosensitive glass for the single-layer glass plate 10 and, similarly to the crystallization portion 101 above, partly crystalizing the single-layer glass plate 10. The transmittance of the low light-transmission portion 102 can be controlled as appropriate on the basis of, for example, the irradiation amount/irradiation time of ultraviolet light or heating.

As shown in FIG. 9, it is desirable that the low transmittance portion 102 be positioned on an outer peripheral edge of one surface of the outer surfaces 100 of the single-layer glass plate 10, such as of the top surface 100*t* in FIG. 9. This makes it possible to, regarding the one surface, easily perceive the outer peripheral edge, in particular, more easily examine the outer appearance at the time of manufacture or use.

As shown in FIG. 10, it is desirable that the low transmittance portion 102 have a cross-shape on one surface of the outer surfaces 100 of the single-layer glass plate 10, for example, on the top surface 100*t* in FIG. 10. This makes it possible to, regarding the one surface, use the cross shape as an alignment mark in, for example, photolithography and to increase processing precision. The cross shape can also be used as a directional mark indicating the polarities of the inductor component 1.

As shown in FIG. 11, the low transmittance portion 102 may be formed on one entire surface of the outer surfaces 100 of the single-layer glass plate 10, for example, on the entire top surface 100*t* in FIG. 11. This makes it possible to, by not allowing the bottom-surface conductors 11*b* and the terminal electrodes 12 to be perceived from the opposite side, for example, from the bottom surface 100*b*, increase the precision with which anything is perceived from the top surface 100*t*. Here, it is possible to, by causing the amorphous portion of the single-layer glass plate 10 to partly remain, such as at the cross shape, provide an alignment mark or a directional mark, as that shown in FIG. 10.

Underlying Insulation Layer 15

Figure 12:
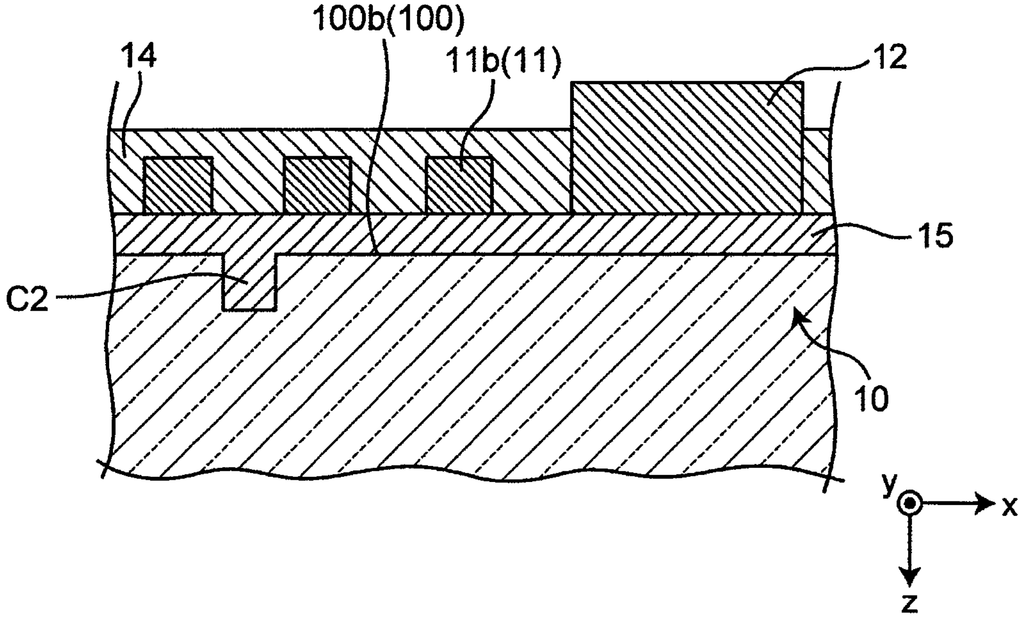
FIG. 12 is a schematic sectional view of the inductor component.

FIG. 12 is a schematic sectional view of the inductor component 1 and shows locations corresponding to those shown in FIG. 6. As shown in FIG. 12, the inductor component 1 may further include an underlying insulation layer 15 disposed on an outer surface 100 of the single-layer glass plate 10, or the bottom surface 100*b* in FIG. 12, and the terminal electrodes 12 may be disposed on the underlying insulation layer 15. At this time, the outer-surface conductors 11 may also be disposed on the underlying insulation layer 15. In this way, the outer-surface conductors 11 and the terminal electrodes 12 may be disposed not only directly on the outer surface 100 of the single-layer glass plate 10, but also above the outer surface 100 with a different member (the underlying insulation layer 15) interposed therebetween.

By using the underlying insulation layer 15, it is possible to adjust, for example, the heights of formation and the degree of close contact of the outer-surface conductors 11 and the terminal electrodes 12, and the electrical characteristics of the inductor element L.

The underlying insulation layer 15 can be formed by, for example, in the above-described manufacturing method, laminating the photosensitive glass board before forming a seed layer with a resin film, such as ABF GX-92 (manufactured by Ajinomoto Fine-Techno Co., Inc.), or applying, subjecting to thermosetting, etc. a paste-like resin with respect to the photosensitive glass board before forming a seed layer.

Figure 4:
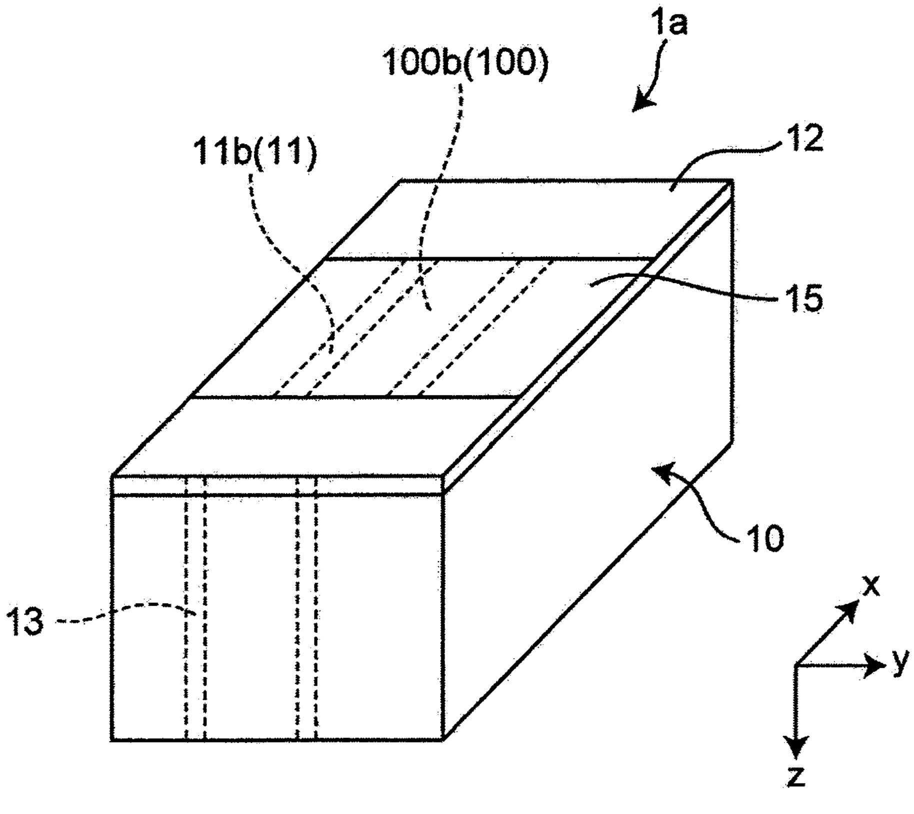
FIG. 4 is a schematic perspective view of an inductor component as viewed from its bottom surface side.
Figure 13:
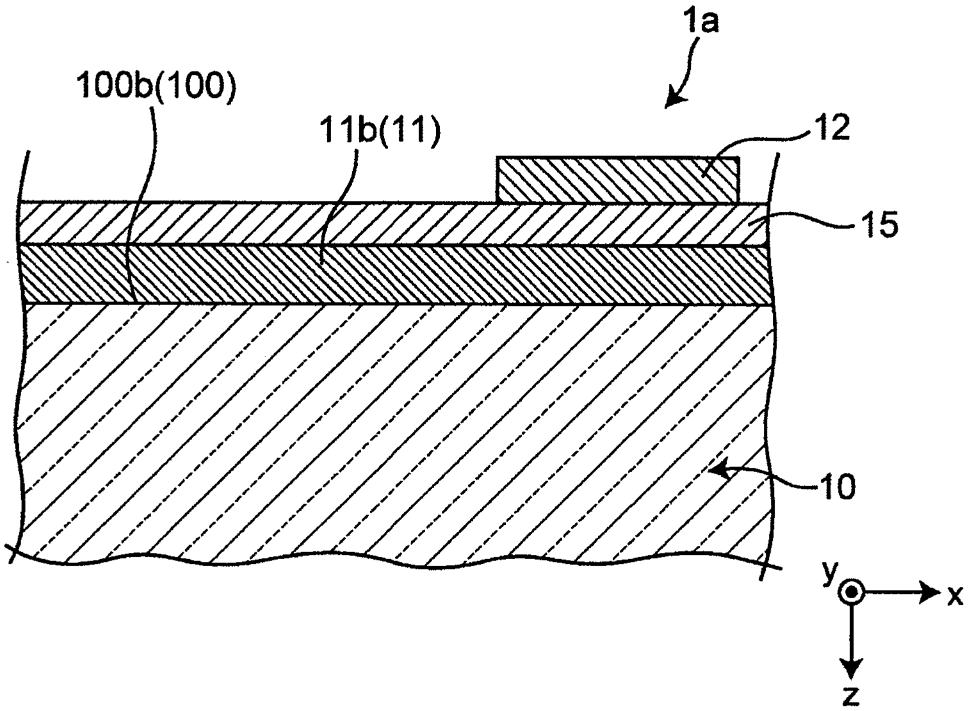
FIG. 13 is a schematic sectional view of the inductor component.

The underlying insulation layer 15 may be disposed on the outer-surface conductors 11. FIG. 4 is a schematic perspective view of an inductor component 1*a* according to the modification as viewed from a bottom surface. FIG. 13 is a schematic sectional view of the inductor component 1*a*. FIG. 13 shows locations corresponding to those shown in FIG. 6.

In the inductor component 1*a*, bottom-surface conductors 11*b* extend in an L direction on the bottom surface 100*b*, which is an outer surface 100 of the single-layer glass plate 10, the underlying insulation layer 15 is disposed on the bottom-surface conductors 11*b*, and the terminal electrodes 12 are disposed on the underlying insulation layer 15. In this way, by forming the outer-surface conductors 11 and the terminal electrodes 12 in different layers, it is possible to design a layout of the outer-surface conductors 11 and the terminal electrodes 12 with greater freedom. In particular, as in the inductor component la, by forming the outer-surface conductors 11 in a longitudinal direction of the single-layer glass plate 10, the inside diameter of the circularly extending wiring is increased, so that the efficiency with which the L value and the Q value of the inductor element L with respect to the external shape of the inductor component 1*a* are obtained is increased.

By forming through wirings (not shown) formed in the underlying insulation layer 15, the terminal electrodes 12 can be electrically connected to the bottom-surface conductors 11*b* and the through wirings 13. Instead of disposing only the terminal electrodes 12 on the underlying insulation layer 15, as a re-wiring layer, a wiring that is electrically connected to the bottom-surface conductors 11*b* and the through wirings 13 may be disposed at the underlying insulation layer 15. This allows the inductor element L to be designed with greater freedom.

Figure 14:
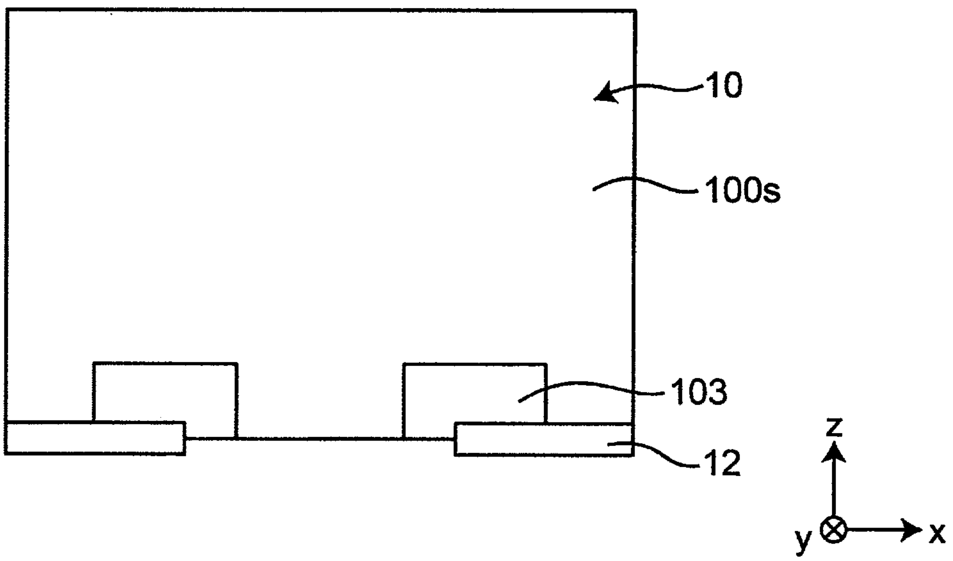
FIG. 14 is a schematic side view of the inductor component.

FIG. 14 is a schematic side view of the inductor component 1. FIG. 14 is a figure showing the inductor component 1 as viewed from a side surface 100*s* parallel to the L direction and the T direction in a plane in which the bottom surface 100*b* and the top surface 100*t* are connected. FIG. 14 does not show the circularly extending wiring 110.

As shown in FIG. 14, in the inductor component 1, the single-layer glass plate 10 includes a reinforcing portion 103 that is harder than the vicinity thereof. An electronic component, such as the inductor component 1, tends to be damaged due to an external force or a thermal shock applied to the inductor component 1 during a manufacturing process or after mounting. In particular, at interfaces between elements having different physical properties, that is, between the single-layer glass plate 10, the outer-surface conductors 11, the terminal electrodes 12, and the through wirings 13, stress tends to concentrate and cracks tend to be produced in the single-layer glass plate 10 with the interfaces as starting points. In the structure above, since the strength can be properly reinforced by the reinforcing portion 103 against local damage and cracks, the strength of the inductor component 1 is increased.

The reinforcing portion 103 can be formed, for example, by using a photosensitive glass for the single-layer glass plate 10 and, similarly to the crystallization portion 101 above, by partly crystalizing the single-layer glass plate 10. The transmittance of the reinforcing portion 103 can be controlled as appropriate on the basis of, for example, the irradiation amount/irradiation time of ultraviolet light or heating.

In particular, it is desirable that the reinforcing portion 103 be positioned below the outer-surface conductors 11 or below the terminal electrodes 12. This makes it possible to effectively reduce the local damage and cracks above. Further, it is desirable that the reinforcing portion 103 be positioned below an outer peripheral edge of each outer-surface conductor 11 or an outer peripheral edge of each terminal electrode 12.

The manufacturing method of the inductor component 1 can also be changed as appropriate. For example, in the manufacturing method described above, individual pieces of single-layer glass plates may be formed by cutting the photosensitive glass board by a photolithography method, the photosensitive glass board having the outer-surface conductors formed thereon.

According to the manufacturing method above, it is possible to cut the photosensitive glass board with high precision while reducing chipping when dividing the photosensitive glass board into pieces. Since this method does not cause a physical shock to be applied to the photosensitive glass board when cutting with a dicing machine as when a dicing blade is used, it is possible to suppress micro-cracks from being produced in the single-layer glass plates. Further, compared to when a dicing blade is used, it is possible to reduce a cutting margin when dividing the photosensitive glass board into pieces, and to increase the number of single-layer glass plates that can be obtained from a photosensitive glass board of the same size.

SECOND REFERENCE EXAMPLE

Figure 15:
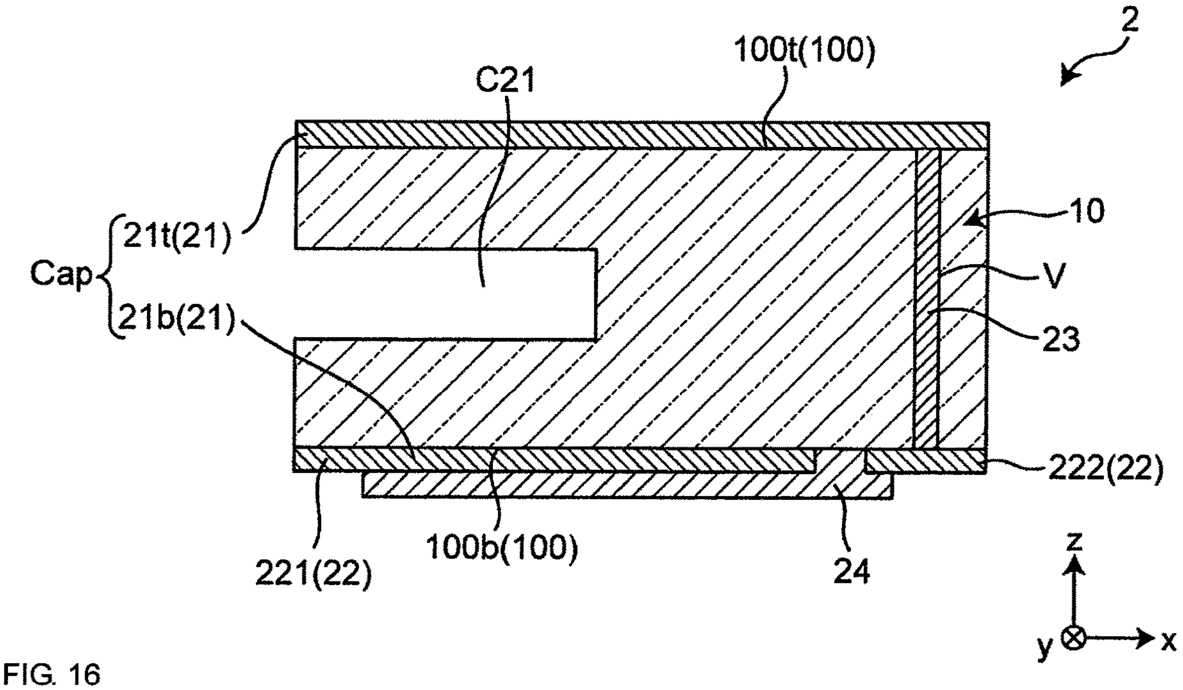
FIG. 15 is a schematic sectional view of a capacitor component.

Although, in the first reference example, the outer-surface conductors are part of the inductor element, the outer-surface conductors are not limited thereto and thus may be part of an electrical element other than the inductor element L. FIG. 15 is a schematic sectional view of a capacitor component 2 according to a second reference example. As shown in FIG. 15, the capacitor component 2 is a surface-mount-type electronic component that includes, as an electrical element, a capacitor element Cap widely used in an electronic circuit.

The capacitor component 2 includes the single-layer glass plate 10 above, outer-surface conductors 21 that are part of the capacitor element Cap serving as an electrical element, and terminal electrodes 22 that are terminals of the capacitor element Cap. The outer-surface conductors 21 are disposed above outer surfaces 100 of the single-layer glass plate 10. The terminal electrodes 22 are disposed above an outer surface 100 and are electrically connected to the outer-surface conductors 21.

Due to the structure above, in the capacitor component 2, since the outer-surface conductors 21 and the terminal electrodes 22 are disposed above the corresponding outer surfaces 100 of the single-layer glass plate 10, the outer-surface conductors 21 and the terminal electrodes 22 are not placed in the single-layer glass plate 10. Therefore, the capacitor component 2 makes it possible to reduce the influence of firing.

In the capacitor component 2, the outer surfaces 100 of the single-layer glass 10 include a bottom surface 100*b* that is one principal surface of the single-layer glass plate 10 and a top surface 100*t* that is positioned on the back side of the bottom surface 100*b*, and the outer-surface conductors 21 include a substantially planar bottom-surface flat-plate electrode 21*b*, where the outer-surface conductor 21 is disposed above the bottom surface 100*b* (in an opposite z direction in FIG. 15) and a substantially planar top-surface flat-plate electrode 21*t* that is disposed above the top surface 100*t* (in the z direction in FIG. 15).

Due to the structure above, in the capacitor component 2, the capacitor element Cap is formed by causing the bottom-surface flat-plate electrode 21*b* and the top-surface flat-plate electrode 21$t$ to be opposite to each other with the single-layer glass plate 10, which is a dielectric layer, interposed therebetween.

In the capacitor component 2, the single-layer glass plate 10 has a cavity C21 at a location interposed between the bottom-surface flat-plate electrode 21$b$ and the top-surface flat-plate electrode 21$t$. The cavity C21 may be the crystallization portion 101 shown in FIG. 5. The capacitor component 2 may include a highly dielectric portion that has a dielectric constant higher than that of the single-layer glass plate 10 and that is disposed in the cavity C21.

Due to the structure above, in the capacitor component 2, it is possible to adjust the capacitance value of the capacitor element Cap by using the cavity C21, the crystallization portion 101, or the highly dielectric portion. Specifically, the dielectric constant of the cavity C21 and the dielectric constant of the crystallization portion 101 are lower than the dielectric constant of the single-layer glass plate 10, so that it is possible to reduce the overall dielectric constant of the dielectric layer on whose respective sides the bottom-surface flat-plate electrode 21$b$ and the top-surface flat-plate electrode 21$t$ are disposed. The highly dielectric portion has a dielectric constant that is higher than that of the single-layer glass plate 10, so that it is possible to increase the overall dielectric constant of the dielectric layer above.

In particular, according to a method of forming the cavity C21 and the crystallization portion 101 by using the photosensitive glass board above, it is possible to form the cavity C21 and the crystallization portion 101 after forming the capacitor element Cap including the bottom-surface flat-plate electrode 21$b$ and the top-surface flat-plate electrode 21$t$ and to adjust the electrical characteristics of the capacitor element Cap after measuring the electrical characteristics of the capacitor element Cap, so that it is possible to adjust the capacitance of the capacitor component 2 and to increase yield. The capacitor component 2 may include only one of the cavity C21, the crystallization portion 101, and the highly dielectric portion, or may include a combination of these.

The capacitor component 2 further includes through wirings 23 that are at least part of the capacitor element Cap, the through wirings 23 extending through through holes V formed in the single-layer glass plate 10 and being electrically connected to the outer-surface conductors 21.

Due to the structure above, in the capacitor component 2, it is possible to form a wiring in a vertical direction with respect to the outer-surface conductors 21 and the terminal electrodes 22, which are disposed above the corresponding outer surfaces 100, and the conductor element Cap is formed with greater freedom. In the capacitor component 2, the through wirings 23 are wirings that connect the top-surface flat-plate electrode 21$t$ and the terminal electrodes 22.

In the capacitor component 2, the terminal electrodes 22 include a first terminal electrode 221 and a second terminal electrode 222, which are input/output terminals of the capacitor element Cap, and the first terminal electrode 221 and the second terminal electrode 222 each have a shape including a principal surface that is parallel to the bottom surface 100$b$ at a location above the bottom surface 100$b$ (opposite z direction).

Due to the structure above, since the capacitor component 2 includes the input/output terminals of the capacitor element Cap, each having a surface that allows solder to adhere thereto in a direction parallel to the bottom surface 100$b$, on a side of the bottom surface 100$b$, the capacitor component 2 is a surface-mount-type electronic component that allows surface mounting with the bottom surface 100$b$ being a mount surface, and that can reduce a mounting area.

The capacitor component 2 further includes a protective film 24 that covers a part of the bottom-surface flat-plate electrode 21$b$. This makes it possible to prevent damage to the bottom-surface flat-plate electrode 21$b$ from occurring and to increase insulation property. In particular, by causing a part of the bottom-surface flat-plate electrode 21$b$ to be exposed from the protective film 24, it is possible to define this part as the terminal electrode 22 (the first terminal electrode 221).

THIRD REFERENCE EXAMPLE

Figure 16:
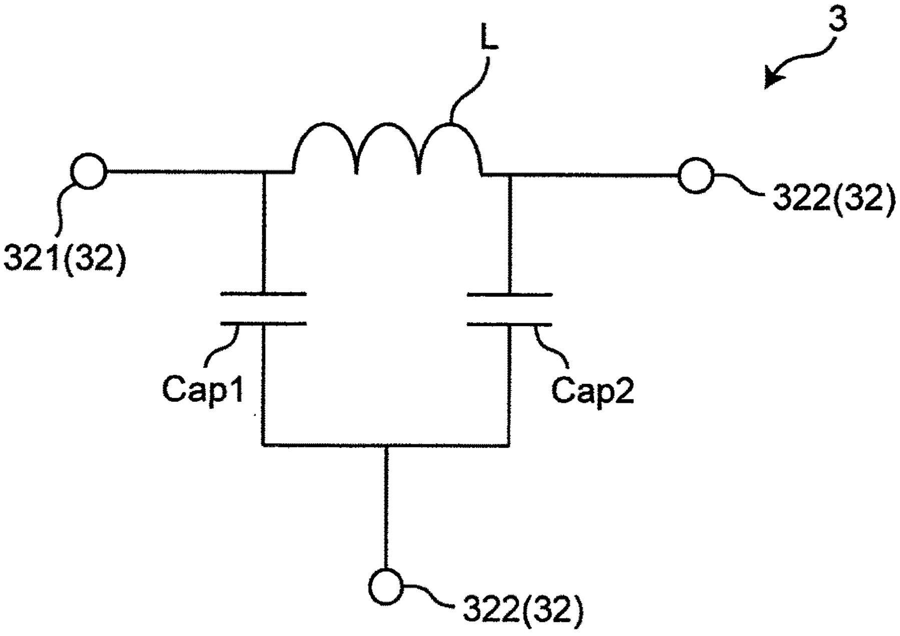
FIG. 16 is an electrical circuit diagram of an electronic component.

Although, in the first reference example and the second reference example, the electronic component is an electronic component including one electrical element, the electronic component is not limited thereto, so that the electronic component may include a plurality of electrical elements therein. FIG. 16 is an electrical circuit diagram of an electronic component 3 according to a third reference example. The electronic component 3 is a surface-mount-type electronic component that includes, as electrical elements, an inductor element L and capacitor elements Cap1 and Cap2.

As shown in FIG. 16, in the electronic component 3, a first terminal electrode 321 is a common terminal of the inductor element L and the capacitor element Cap1, a second terminal electrode 322 is a common terminal of the inductor element L and the capacitor element Cap2, and a third terminal electrode 323 is a common terminal of the capacitor elements Cap1 and Cap2. Therefore, in the electronic component 3, the inductor element L and the capacitor elements Cap1 and Cap2 constitute a $\pi$-type LC filter.

Figure 17:
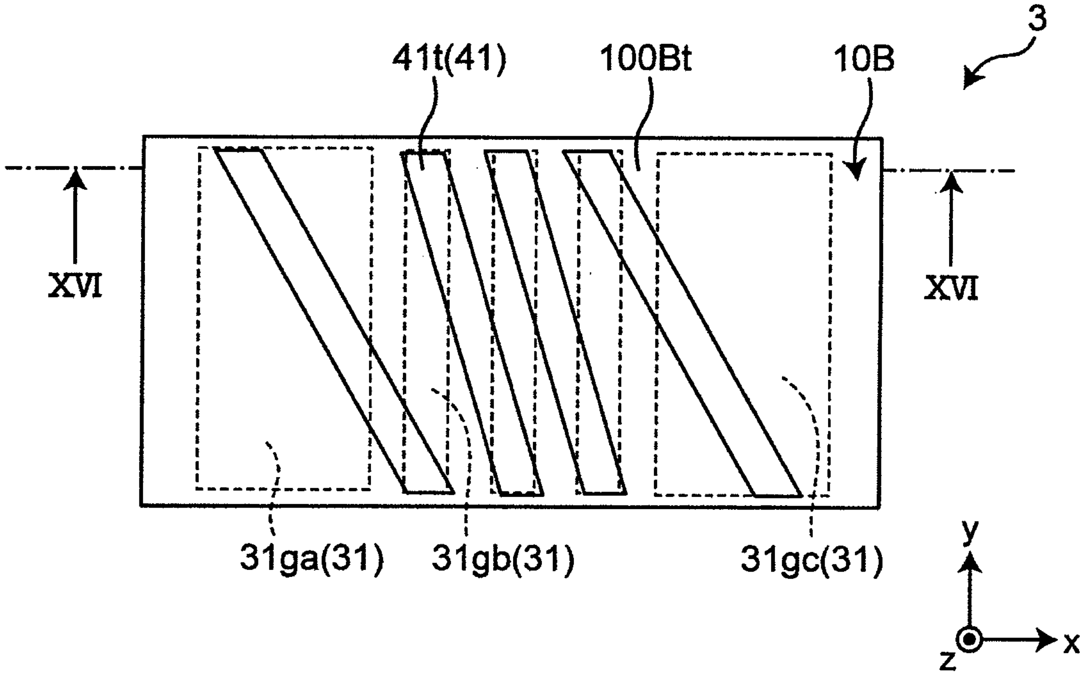
FIG. 17 is a schematic top view of the electronic component.
Figure 18:
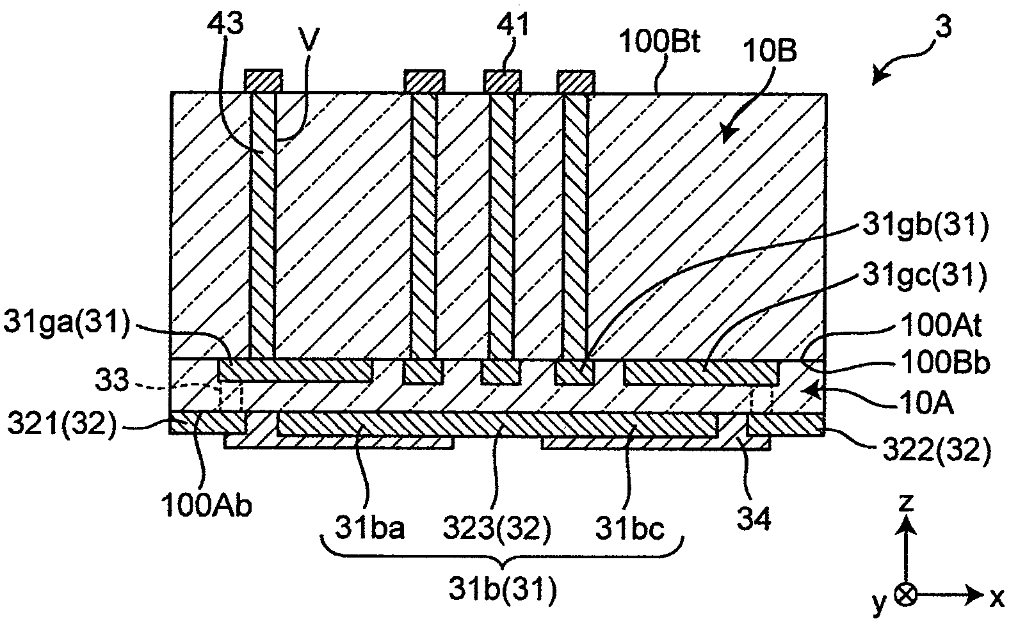
FIG. 18 is a schematic sectional view of the electronic component.
Figure 19:
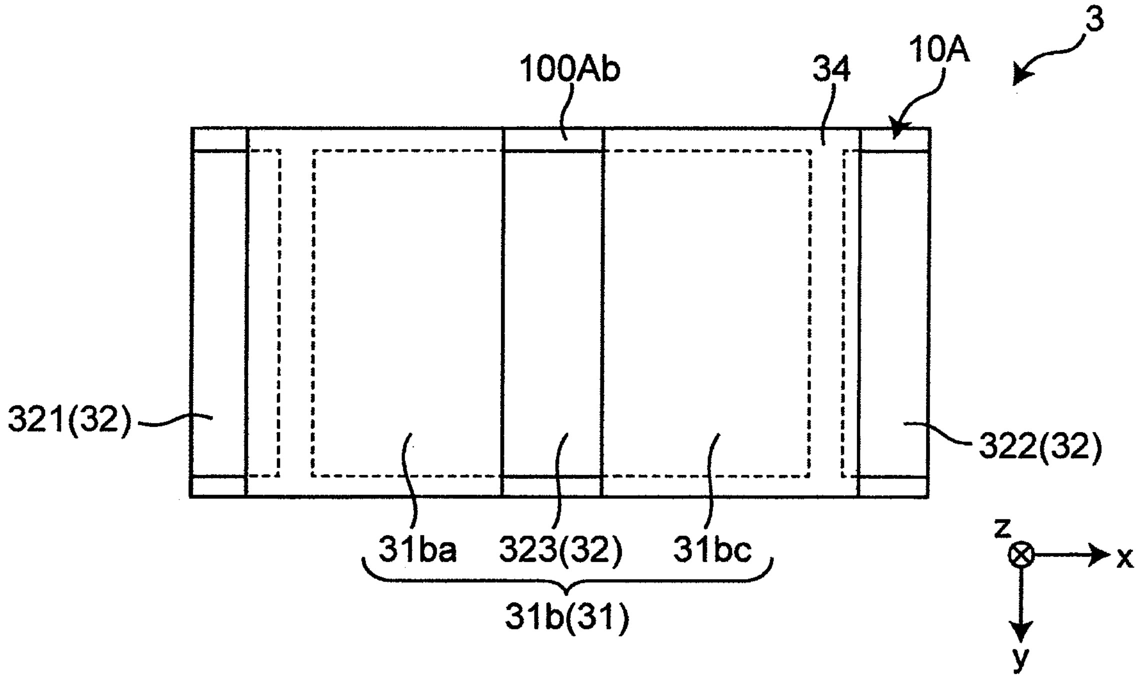
FIG. 19 is a schematic bottom view of the electronic component.

Next, a specific structure of the electronic component 3 is described. FIG. 17 is a schematic top view of the electronic component 3. FIG. 18 is a schematic sectional view of the electronic component 3. FIG. 19 is a schematic bottom view of the electronic component 3. FIG. 18 is a sectional view along an alternate long and short dashed line, that is, along XVI-XVI shown in FIG. 17.

The electronic component 3 includes a single-layer glass plate 10A, outer-surface conductors 31, and terminal electrodes 32 that are terminals of the inductor element L, the capacitor element Cap1, or the capacitor element Cap2. The outer-surface conductors 31 are each disposed above (opposite z direction) a bottom surface 100Ab or above (z direction) a top surface 100At, the bottom surface 100Ab and the top surface 100At being outer surfaces of the single-layer glass plate 10A, and are part of the inductor element L, the capacitor element Cap1, or the capacitor element Cap2. The terminal electrodes 32 are disposed above (opposite z direction) the bottom surface 100Ab and are electrically connected to the outer-surface conductors 31.

The outer-surface conductors 31 disposed above the top surface 100At are grooved-portion conductors 31$ga$, 31$gb$, and 31$gc$ similarly to the grooved-portion conductors 11$g$ shown in FIG. 6.

Due to the structure above, in the electronic component 3, since the outer-surface conductors 31 are each disposed on a corresponding one of the outer surfaces 100Ab and 100At of the single-layer glass plate 10A, the outer-surface conductors 31 are not placed in the single-layer glass plate 10A. Therefore, the electronic component 3 makes it possible to reduce the influence of firing.

The electronic component 3 further includes a second single-layer glass plate 10B that differs from the single-layer glass plate 10A. The second single-layer glass plate 10B is disposed above (z direction) the grooved-portion conductors 31*ga,* 31*gb,* and 31*gc*. Conversely, this means that the grooved-portion conductors 31*ga,* 31*gb,* and 31*gc* are disposed above (opposite z direction) the bottom surface 100Bb, which is an outer surface, with respect to the second single-layer glass plate 10B.

Due to the structure above, in the electronic component 3, the grooved-portion conductors 31*ga,* 31*gb,* and 31*gc* can be internal conductors, and three-dimensional wiring is possible by providing multi-layers, so that the electronic component 3 is designed with greater freedom. As described above, since the grooved-portion conductors 31*ga,* 31*gb,* and 31*gc* are disposed above the top surface 100At and the bottom surface 100Bb, which are outer surfaces, with respect to the single-layer glass plate 10A and the second single-layer glass plate 10B, the grooved-portion conductors 31*ga,* 31*gb,* and 31*gc* are not placed in the single-layer glass plate 10A and the second single-layer glass plate. Therefore, even in the structure above, the electronic component 3 makes it possible to reduce the influence of firing.

In the electronic component 3, the top surface 100At of the single-layer glass plate 10A and the bottom surface 100Bb of the second single-layer glass plate 10B are joined to each other. Therefore, the electronic component 3 can have a multi-layer structure. A method of joining the single-layer glass plate 10A and the second single-layer glass plate 10B when the grooved-portion conductors 31*ga*, 31*gb*, and 31*gc* have been formed after sintering the single-layer glass plate 10A and the second single-layer glass plate 10B is described below.

The electronic component 3 further includes outer-surface conductors 41 that are disposed above (z direction) a top surface 100Bt, which is an outer surface of the second single-layer glass plate 10B, and are part of the inductor element L. Due to the structure above, in the electronic component 3, since the outer-surface conductors 41 are disposed above an outer surface of the second single-layer glass plate 10B, the outer-surface conductors 41 are not placed in the second single-layer glass plate 10B. Therefore, the electronic component 3 makes it possible to reduce the influence of firing.

In the electronic component 3, the grooved-portion conductors 31*ga*, 31*gb*, and 31*gc* include substantially planar grooved-portion flat-plate electrodes 31*ga* and 31*gc*, and the outer-surface conductors 31 include substantially planar facing flat-plate electrodes 31*b* facing the grooved-portion flat-plate electrodes 31*ga* and 31*gc* with the single-layer glass plate 10A interposed therebetween.

Due to the structure above, in the electronic component 3, the grooved-portion flat-plate electrodes 31*ga* and 31*gc* and the corresponding facing flat-plate electrodes 31*b* constitute the corresponding capacitors Cap1 and Cap2. Specifically, the facing flat-plate electrodes 31*b* include facing flat-plate electrodes 31*ba* and 31*bc* facing the corresponding grooved-portion flat-plate electrodes 31*ga* and 31*gc;* the grooved-portion flat-plate electrode 31*ga* and the facing flat-plate electrode 31*ba* constitute the capacitor element Cap1; and the grooved-portion flat-plate electrode 31*gc* and the facing flat-plate electrode 31*bc* constitute the capacitor element Cap2. In this way, the electronic component 3 has the capacitor elements Cap1 and Cap2 built therein.

Further, in the electronic component 3, as shown in FIGS. 18 and 19, by the facing flat-plate electrodes 31*b* including a third terminal electrode 323 that is a portion exposed from the protective film 34, the terminal electrodes 32 are provided.

Due to the structure above, in the electronic component 3, it is possible to reduce the size and height of the electronic component 3 as an electronic component including an LC filter. In ordinary multi-layer-type electronic components, from the viewpoint of ensuring strength, an outer-layer portion between internal electrodes and the outer surfaces of such electronic components is made thicker than interlayer insulation layers disposed in the interior. Therefore, when the facing flat-plate electrodes are disposed on an outer surface of such electronic components, the electrode interval between the facing flat-plate electrodes and flat-plate electrodes inside a multi-layer body is increased, as a result of which the required electrical characteristics may not be obtained. Therefore, ordinarily, the facing flat-plate electrodes facing the flat-plate electrodes inside the multi-layer body are also disposed inside the multi-layer body. Therefore, in addition to the structure being a three-layer structure including the flat-plate electrodes, the facing flat-plate electrodes, and the terminal electrodes, the outer layer between the facing flat-plate electrodes and the terminal electrodes becomes thicker than the interlayer insulation layers between the flat-plate electrodes and the facing flat-plate electrodes, and the overall thickness is increased.

On the other hand, in the electronic component 3, since a sufficient strength of the single-layer glass plate 10A can be ensured, it is possible to thinly process the glass plate than before and to dispose the facing flat-plate electrodes 31*b* on the outer surface 100Ab. As a result, the electronic component 3 is a two-layer structure including the grooved-portion flat-plate electrodes 31*ga* and 31*gc* and the facing flat-plate electrodes 31*b*, and the single-layer glass plate 10A can be made sufficiently thin and compared to existing structures, the size and height of the electronic component 3 can be reduced. In particular, in the electronic component 3, since a side of the top surface 100At of the single-layer glass plate 10A is a side of the grooved-portion flat-plate electrodes 31*ga* and 31*gc*, it is possible to reduce the distance between the electrodes of each of the capacitor elements Cap1 and Cap2 while reducing the influence on the strength (the thickness) of the single-layer glass plate 10A.

In the electronic component 3, as described above, since the facing flat-plate electrodes 31*b* are used as the terminal electrodes 32, it is possible to reduce the number of electrodes for forming the capacitor elements Cap1 and Cap2, so that it is possible to reduce the stray capacitance, improve the electrical characteristics, and reduce variations in the characteristics.

The electronic component 3 further includes through wirings 33 and 43 that are at least part of the inductor element L, the capacitor element Cap1, or the capacitor element Cap2, the through wirings 33 and 43 extending through through holes V formed in a corresponding one of the single-layer glass plates 10A and 10B and being electrically connected to a corresponding one of the outer-surface conductors 31 and 41.

Due to the structure above, in the electronic component 3, it is possible to form a wiring in a vertical direction with respect to the outer-surface conductors 31 and 41 and the terminal electrodes 32, which are disposed above the corresponding outer surfaces 100, and the inductor element L, the capacitor element Cap1, or the capacitor element Cap2 is formed with greater freedom.

In the electronic component 3, the through wirings 33 are wirings that connect the corresponding grooved-portion flat-plate electrodes 31*ga* and 31*gc* to the corresponding first and second terminal electrodes 321 and 322. In the electronic component 3, the through wirings 43 connect the grooved-portion conductors 31_gb_ and the corresponding outer-surface conductors 41 to each other, and a circularly extending wiring constituted by the grooved-portion conductors 31_gb_, the outer-surface conductors 41, and the through wirings 43 circularly extends around a winding axis (not shown) that is parallel to the bottom surface 100Ab. Due to the structure above, the circularly extending wiring constitutes a main portion of the inductor element L, and becomes the electronic component 3 including the inductor element L.

In the electronic component 3, the terminal electrodes 32 include the first terminal electrode 321, the second terminal electrode 322, and the third terminal electrode 323, which are each an input/output terminal of any of the inductor element L, the capacitor element Cap1, and the capacitor element Cap2; and, at locations above (opposite z direction) the bottom surface 100Ab, the first terminal electrode 321, the second terminal electrode 322, and the third terminal electrode 323 each have a shape including a principal surface that is parallel to the bottom surface 100Ab.

Due to the structure above, since the electronic component 3 includes the input/output terminals of the inductor element L, the capacitor elements Cap1, or the capacitor element Cap2, each having a surface that allows solder to adhere thereto in a direction parallel to the bottom surface 100Ab, on a side of the bottom surface 100Ab, the electronic component 3 is a surface-mount-type electronic component that allows surface-mounting with the bottom surface 100Ab being a mount surface and that can reduce a mounting area.

The electronic component 3 further includes the protective film 34 that covers part of the facing flat-plate electrodes 31_b_, specifically, the facing flat-plate electrodes 31_ba_ and 31_bc_. Therefore, it is possible to prevent damage to the facing flat-plate electrodes 31_ba_ and 31_bc_ from occurring and to increase insulation property. In particular, by causing a part of the facing flat-plate electrodes 31_b_ to be exposed from the protective film 34, it is possible to define this part as the terminal electrode 32 (the third terminal electrode 323).

Method of Joining Single-Layer Glass Plate 10A and Second Single-Layer Glass Plate 10B In the electronic component 3, the top surface 100At of the single-layer glass plate 10A and the bottom surface 100Bb of the second single-layer glass plate 10B are joined to each other. The glass plates may be directly joined to each other by, for example, using a photosensitive glass for the single-layer glass plate 10A or the second single-layer glass plate 10B and activating the surface of the photosensitive glass by wet etching or dry etching. The top surface 100At of the single-layer glass plate 10A and the bottom surface 100Bb of the second single-layer glass plate 10B may be joined to each other by interposing an adhesive layer, such as a thermosetting resin layer or a thermoplastic resin layer, between them.

At this time, for example, the grooved-portion conductors 31_ga_, 31_gb_, and 31_gc_ may be formed on the single-layer glass plate 10A before the joining or may be formed after the single-layer glass plate 10A and the second single-layer glass plate 10B have been joined to each other. Specifically, for example, it is possible to, after forming grooved portions in the top surface 100At of the single-layer glass plate 10A and disposing the grooved-portion conductors 31_ga_, 31_gb_, and 31_gc_ in the grooved portions, join the top surface 100At of the single-layer glass plate 10A and the bottom surface 100Bb of the second single-layer glass plate 10B to each other.

The method is not limited thereto. For example, it is possible to form grooved portions in the top surface 100At of the single-layer glass plate 10A after joining the top surface 100At to the second single-layer glass plate 10B or join the single-layer glass plate 10A and the second single-layer glass plate 10B to each other after forming grooved portions in the top surface 100At, and then form the grooved-portion conductors 31_ga_, 31_gb_, and 31_gc_ in the grooved portions. When the grooved-portion conductors 31_ga_, 31_gb_, and 31_gc_ are formed in the grooved portions after the joining of the plates, the grooved-portion conductors 31_ga_, 31_gb_, and 31_gc_ can be brought into close contact with the top surface 100At of the single-layer glass plate 10A and the bottom surface 100Bb of the second single-layer glass plate 10B, which is desirable. Even if an adhesive layer is used, spaces between the grooved-portion conductors 31_ga_, 31_gb_, and 31_gc_ and each of the top surface 100At of the single-layer glass plate 10A and the bottom surface 100Bb of the second single-layer glass plate 10B can be filled due to plastic deformation of the adhesive layer, which is desirable.

In the electronic component 3, although the grooved-portion flat-plate electrodes 31_ga_ and 31_gc_ and the facing flat-plate electrodes 31_ba_ and 31_bc_ face each other with the single-layer glass plate 10A interposed therebetween, the outer-surface conductors 41 may include the substantially planar facing flat-plate electrodes or the terminal electrodes that face with the second single-layer glass plate 10B interposed therebetween.

In the electronic component 3, the facing flat-plate electrodes 31_b_ may be grooved-portion flat-plate electrodes. At this time, the grooved-portion flat-plate electrodes are the terminal electrodes 32.

In the electronic component 3, although the circularly extending wiring, which is a main portion of the inductor element L, circularly extends on a side of the second single-layer glass plate 10B, the circularly extending wiring may circularly extend on a side of the single-layer glass plate 10A.

FOURTH REFERENCE EXAMPLE

Figure 20:
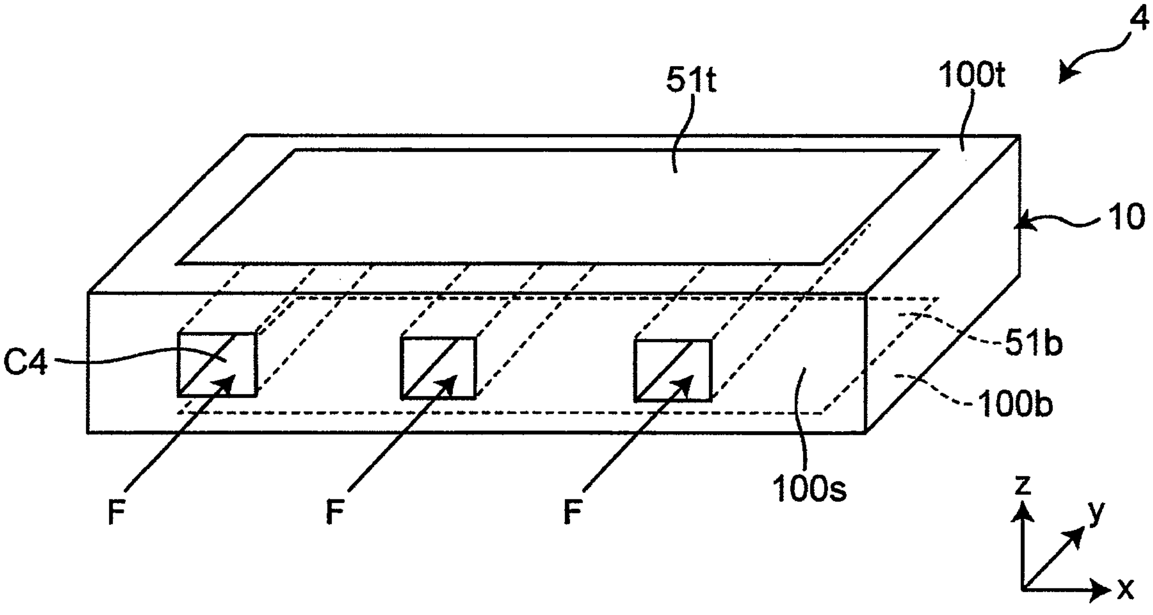
FIG. 20 is a schematic perspective view of an electronic component.

Although, in the first reference example to the third reference example, the electronic components are surface-mount-type electronic components, they are not limited thereto. For example, a three-dimensional mounting electronic component may be used. FIG. 20 is a schematic perspective view of an electronic component 4 according to a fourth reference example. The electronic component 4 is a three-dimensional mounting sensor including a sensor element that detects whether or not there is a fluid F and a flow rate.

In the electronic component 4, a top-surface flat-plate electrode 51_t_ and a bottom-surface flat-plate electrode 51_b_ that are disposed above a top surface 100_t_ and a bottom surface 100_b_, respectively, of a single-layer glass plate 10 are outer-surface conductors, which are part of the sensor element, and are terminal electrodes, which are terminals of the sensor element. That is, even the electronic component 4 includes the single-layer glass plate 10, and the top-surface flat-plate electrode 51_t_ and the bottom-surface flat-plate electrode 51_b_, which are disposed above the outer surface 100_t_ and the outer surface 100_b_ of the single-layer glass plate 10, respectively, and which are part of the sensor element and which are terminals. Therefore, the electronic component 4 makes it possible to reduce the influence of firing.

Since the electronic component 4 includes the terminal electrodes 51t and 51b at the respective top and bottom surfaces 100t and 100b, for example, if one of the terminal electrodes 51t and 51b is mounted on a land of a board, such as a substrate or an interposer, and the other of the terminal electrodes 51t and 51b is connected to a terminal of a semiconductor chip by using solder, a bonding wire, or the like, three-dimensional mounting becomes possible.

In the electronic component 4, the single-layer glass plate 10 includes principal surfaces, that is, the top surface 100t and the bottom surface 100b, and a side surface 100s that is orthogonal to the top surface 100t and the bottom surface 100b. The top-surface flat-plate electrode 51t and the bottom-surface flat-plate electrode 51b, which are outer-surface conductors, are disposed at the respective principal surfaces that are outer surfaces. The single-layer glass plate 10 includes a cavity C4 that opens in the side surface 100s.

Due to the structure above, an electronic element using the cavity C4 can be designed. Specifically, with the cavity C4 being defined as a flow path, the electronic component 4 is capable of detecting whether or not a fluid that flows in the cavity C4 exists or the flow rate of the fluid as changes in electrostatic capacity at the top-surface flat-plate electrode 51t and the bottom-surface flat-plate electrode 51b, and can be used as a fluid sensor. However, the method of use of the cavity C4 is not limited thereto. For example, it is possible to, by using the cavity C4 as a through hole in which a through wiring is disposed, design a more sophisticated electrical element. For example, if the through wiring is connected to a ground electrode of a mounting board via the side surface 100s, it is possible to, when a surge voltage caused by static electricity or a lightning strike occurs, form a path into which a surge current is caused to flow to a side of the ground electrode and provide the electronic component 4 with the function of dealing with static electricity.

OTHER REFERENCE EXAMPLES

The various features that have been described in the first reference example, the second reference example, the third reference example, and the fourth reference example above can be individually added, deleted, and changed in relation to each of the reference examples or in relation to other reference examples. Further, publicly known structures can be added to, deleted from, and changed in relation to these reference examples.

Figure 21:
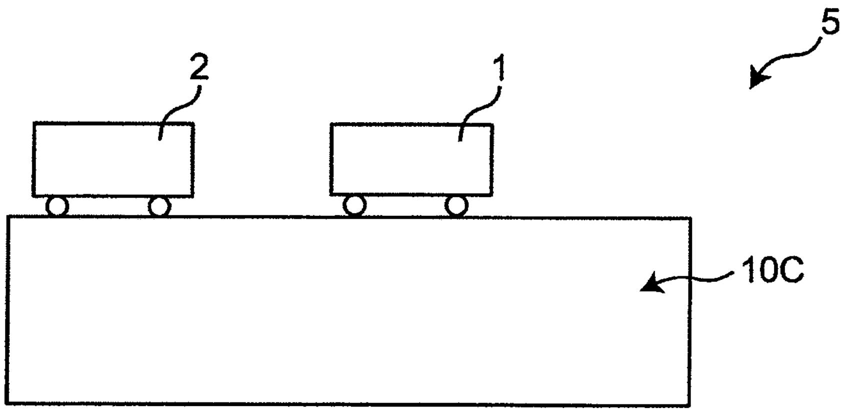
FIG. 21 is a schematic sectional view of an electronic-component mounting board.

The electronic components according to the first to fourth reference examples above or according to reference examples in which any of the first to fourth reference examples has been modified as appropriate are desirably mounted on a particular mounting board. FIG. 21 is a schematic sectional view of an electronic-component mounting board 5.

The electronic-component mounting board 5 includes the inductor component 1 of the first reference example, the capacitor component 2 of the second reference example, and a glass board 10C on which the inductor component 1 and the capacitor component 2 of the second reference example are mounted.

According to the structure above, since the single-layer glass plate 10, which is a structural body of the inductor component 1 and the capacitor component 2, and the glass board 10C are made of the same material and their coefficients of linear expansion are close to each other, the inductor component 1 and the capacitor component 2 can be made more reliable with respect to thermal expansion and thermal shrinkage occurring in the glass board 10C in, for example, a thermal shock test.

As described above, what is mounted on the glass board 10C is an electronic component using a single-layer glass plate as a structural body, and may be, for example, the electronic component 3 or the electronic component 4. Electronic components other than these electronic components may also be mounted. Even in this case, at least electronic components using a single-layer glass plate as a structural body can be made more reliable.

The glass board 10C may be one corresponding to a printed wiring board used in an electronic device, an auxiliary board that is mounted on the printed wiring board, such as a mother board, or a built-in board, such as an interposer or a substrate, used in a semiconductor or an electronic module.

While preferred reference examples of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a single-layer glass plate of a rectangular parallelepiped shape with a length, a width, and a height, the length being longer than the width, the single-layer glass plate having a bottom surface defined by the length and the width and a top surface positioned on a back side of the bottom surface;

bottom-surface conductors disposed on the bottom surface and top-surface conductors disposed on the top surface;

through wirings each extending through a corresponding one of through holes in the single-layer glass plate;

an underlying insulation layer disposed above the bottom-surface conductors; and a first terminal electrode and a second terminal electrode disposed above the underlying insulation layer, the bottom-surface conductors, the top-surface conductors, and the through wirings being electrically connected to each other to constitute a circularly extending wiring that circularly extends around a winding axis parallel to the bottom surface and the length, the circularly extending wiring, the first terminal electrode, and the second terminal electrode being electrically connected to each other to constitute an inductor element, the single-layer glass plate containing cerium oxide, and the single-layer glass plate including a grooved portion on the bottom surface, wherein the bottom-surface conductors are wound around the bottom surface along the grooved portion.

2. The inductor component of claim 1, wherein the first terminal electrode and the second terminal electrode are each shaped to have, above the bottom surface, a principal surface parallel to the bottom surface.

3. The inductor component of claim 1, wherein the first terminal electrode and the second terminal electrode are positioned overlapping with the bottom-surface conductors, as viewed from a direction parallel to the height.

4. The inductor component of claim 1, wherein the circularly extending wiring circulates one or more times at a position overlapping with the first terminal electrode, as viewed from a direction parallel to the height.

5. The inductor component of claim 1, wherein the circularly extending wiring does not circulate three or more times at a position overlapping with the first terminal electrode, as viewed from a direction parallel to the height.

6. The inductor component of claim 1, wherein the underlying insulation layer covers whole of the bottom surface.

7. The inductor component of claim 1, wherein the underlying insulation layer covers all of the bottom-surface conductors.

8. An inductor component comprising:
a single-layer glass plate of a rectangular parallelepiped shape with a length, a width, and a height, the length being longer than the width, the single-layer glass plate having a bottom surface defined by the length and the width and a top surface positioned on a back side of the bottom surface;
bottom-surface conductors disposed on the bottom surface and top-surface conductors disposed on the top surface;
through wirings each extending through a corresponding one of through holes in the single-layer glass plate;
an underlying insulation layer disposed above the bottom-surface conductors; and
a first terminal electrode and a second terminal electrode disposed above the underlying insulation layer,
the bottom-surface conductors, the top-surface conductors, and the through wirings being electrically connected to each other to constitute a circularly extending wiring that circularly extends around a winding axis parallel to the bottom surface and the length,
the circularly extending wiring, the first terminal electrode, and the second terminal electrode being electrically connected to each other to constitute an inductor element,
the underlying insulation layer being an inorganic film, and
the single-layer glass plate including a grooved portion on the bottom surface, wherein the bottom-surface conductors are wound around the bottom surface along the grooved portion.

9. The inductor component of claim 8, wherein the first terminal electrode and the second terminal electrode are each shaped to have, above the bottom surface, a principal surface parallel to the bottom surface.

10. The inductor component of claim 8, wherein the first terminal electrode and the second terminal electrode are positioned overlapping with the bottom-surface conductors, as viewed from a direction parallel to the height.

11. The inductor component of claim 8, wherein the circularly extending wiring circulates one or more times at a position overlapping with the first terminal electrode, as viewed from a direction parallel to the height.

12. The inductor component of claim 8, wherein the circularly extending wiring does not circulate three or more times at a position overlapping with the first terminal electrode, as viewed from a direction parallel to the height.

13. The inductor component of claim 8, wherein the underlying insulation layer covers whole of the bottom surface.

14. The inductor component of claim 8, wherein the underlying insulation layer covers all of the bottom-surface conductors.

15. An inductor component comprising:
a single-layer glass plate of a rectangular parallelepiped shape with a length, a width, and a height, the length being longer than the width, the single-layer glass plate having a bottom surface defined by the length and the width and a top surface positioned on a back side of the bottom surface;
bottom-surface conductors disposed on the bottom surface and top-surface conductors disposed on the top surface;
through wirings each extending through a corresponding one of through holes in the single-layer glass plate;
an underlying insulation layer disposed above the bottom-surface conductors; and
a first terminal electrode and a second terminal electrode disposed above the underlying insulation layer,
the bottom-surface conductors, the top-surface conductors, and the through wirings being electrically connected to each other to constitute a circularly extending wiring that circularly extends around a winding axis parallel to the bottom surface and the length, and
the circularly extending wiring, the first terminal electrode, and the second terminal electrode being electrically connected to each other to constitute an inductor element, wherein
the underlying insulation layer covers a part of the bottom surface and does not cover any area that connects to the sides of the bottom surface.

16. The inductor component of claim 15, wherein the first terminal electrode and the second terminal electrode are each shaped to have, above the bottom surface, a principal surface parallel to the bottom surface.

17. The inductor component of claim 15, wherein the first terminal electrode and the second terminal electrode are positioned overlapping with the bottom-surface conductors, as viewed from a direction parallel to the height.

18. The inductor component of claim 15, wherein the circularly extending wiring circulates one or more times at a position overlapping with the first terminal electrode, as viewed from a direction parallel to the height.

* * * * *